United States Patent
O Mahony et al.

(10) Patent No.: US 11,163,468 B2
(45) Date of Patent: Nov. 2, 2021

(54) METADATA COMPRESSION TECHNIQUES

(71) Applicant: EMC IP Holding Company LLC, Hopkinton, MA (US)

(72) Inventors: Aidan O Mahony, Cork (IE); Jason J. Duquette, Milford, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 182 days.

(21) Appl. No.: 16/458,864

(22) Filed: Jul. 1, 2019

(65) Prior Publication Data
US 2021/0004157 A1    Jan. 7, 2021

(51) Int. Cl.
*G06F 3/06* (2006.01)
*G06F 16/9035* (2019.01)
*G06F 12/0802* (2016.01)
*G06F 16/907* (2019.01)

(52) U.S. Cl.
CPC ............ *G06F 3/064* (2013.01); *G06F 3/0619* (2013.01); *G06F 3/0626* (2013.01); *G06F 12/0802* (2013.01); *G06F 16/907* (2019.01); *G06F 16/9035* (2019.01); *G06F 3/0679* (2013.01); *G06F 2212/401* (2013.01)

(58) Field of Classification Search
None
See application file for complete search history.

(56) References Cited

U.S. PATENT DOCUMENTS

| | | | |
|---|---|---|---|
| 7,533,137 B1 * | 5/2009 | Timpanaro-Perrotta | G06F 16/1724 |
| 8,712,978 B1 * | 4/2014 | Shilane | G06F 16/1744 707/693 |
| 9,411,815 B1 * | 8/2016 | Lu | G06F 11/1453 |
| 10,114,846 B1 * | 10/2018 | Shah | G06F 16/90348 |

(Continued)

OTHER PUBLICATIONS

X. Nguyen, H. Nguyen and C. Pham, "A bit-level matrix transpose for bitmap-index-based data analytics," 2016 IEEE Sixth International Conference on Communications and Electronics (ICCE), Ha-Long, Vietnam, 2016, pp. 217-220, doi: 10.1109/CCE.2016.7562639. (Year: 2016).*

(Continued)

*Primary Examiner* — William E. Baughman
(74) *Attorney, Agent, or Firm* — Muirhead and Saturnelli, LLC

(57) ABSTRACT

Techniques for processing metadata (MD) may include: determining, in accordance with one or more criteria, a plurality of MD blocks that are similar and expected to have matching corresponding portions of MD in at least some of the plurality of MD blocks; forming a MD superblock including the plurality of MD blocks; filtering the MD superblock and generating a filtered MD superblock, wherein said filtering includes rearranging content of the MD superblock so that a first plurality of MD portions that are similar are grouped together in the filtered MD superblock, wherein at least some of the first plurality of MD portions that are similar are expected to match; and compressing the filtered MD superblock and generating a com- (Continued)

pressed filtered MD superblock. Filtering may include performing a bitshuffle algorithm that includes performing a bitwise transpose of a matrix of the MD blocks in the MD superblock.

21 Claims, 11 Drawing Sheets

(56) References Cited

U.S. PATENT DOCUMENTS

| | | | | |
|---|---|---|---|---|
| 2012/0047344 A1* | 2/2012 | Sheaffer | ............... | G06F 9/3013 |
| | | | | 711/165 |
| 2014/0006465 A1* | 1/2014 | Davis | ................... | G06F 16/183 |
| | | | | 707/827 |
| 2014/0149357 A1* | 5/2014 | Gupta | ................ | G06F 16/2308 |
| | | | | 707/652 |
| 2016/0004598 A1* | 1/2016 | Lillibridge | .......... | G06F 11/1448 |
| | | | | 707/654 |
| 2016/0259591 A1* | 9/2016 | Arikawa | ............... | G06F 3/0608 |
| 2016/0371190 A1* | 12/2016 | Romanovskiy | ......... | G06F 3/064 |
| 2017/0031945 A1* | 2/2017 | Sarab | .................. | G06F 16/1748 |
| 2018/0004513 A1* | 1/2018 | Plotnikov | ........... | G06F 9/30021 |
| 2018/0314712 A1* | 11/2018 | Stefani | ............... | G06F 16/1744 |

OTHER PUBLICATIONS

Kiyoshi Masui, et al., "A compression scheme for radio data in high performance computing," Department of Physics and Astronomy, arXiv:1503.00638v3 [astro-ph.IM] Sep. 18, 2015, https://doi.org/10.1016/i.ascom.2015.07.002.

Francesc Alted, "Why Modern CPUs Are Starving and What Can Be Done About It," Scientific Programming, Computing in Science, Mar./Apr. 2010 IEEE, http://www.sciencedirect.com/science/article/pii/S2213133715000694.

Francesc Alted, "Is ARM Hungry Enough to Eat Intel's Favorite Pie?", www.blosc.org, Jan. 17, 2019.

* cited by examiner

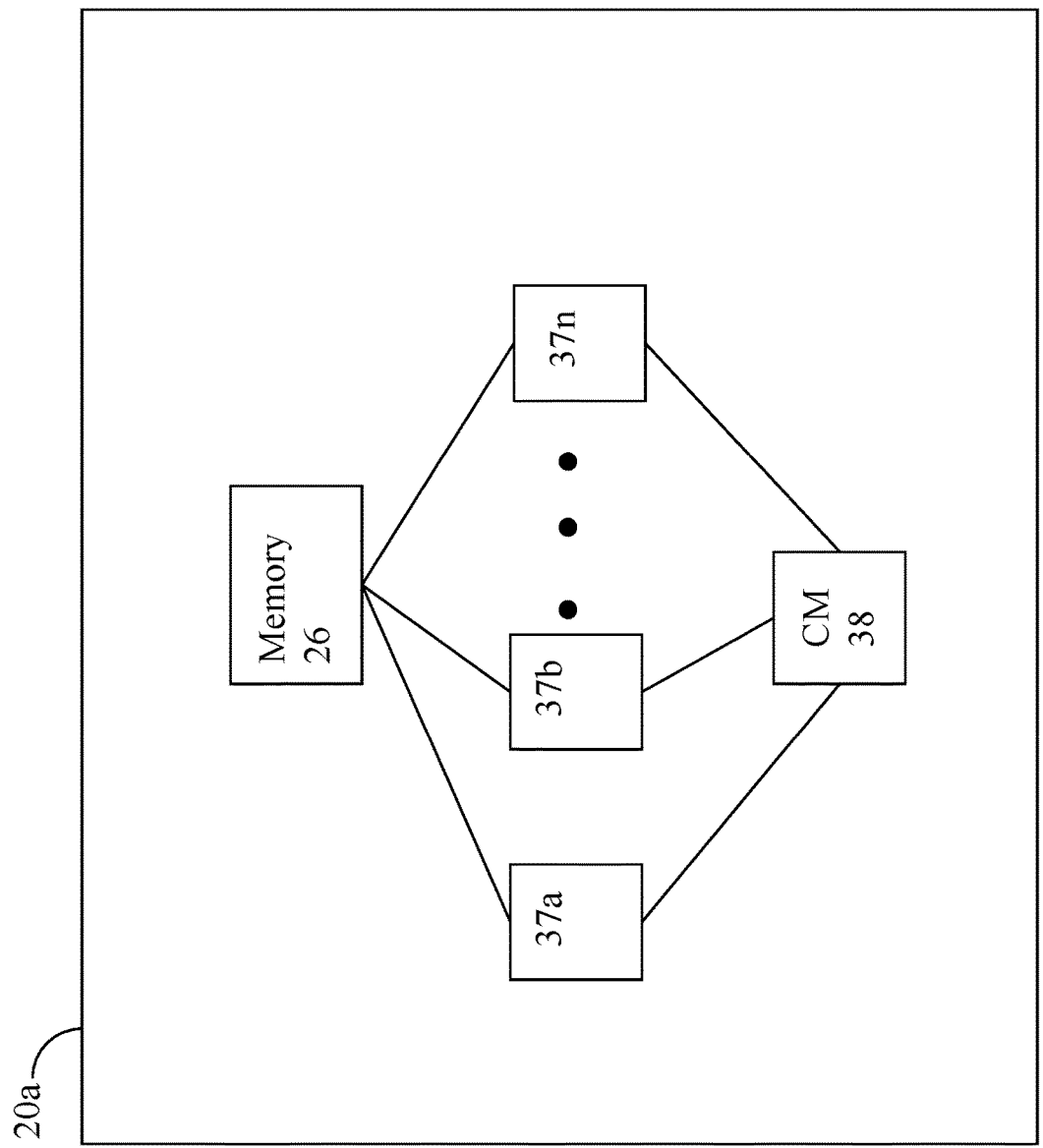

| | TS 302 | LUN ID 304 | LBA 306 | | | | | |
|---|---|---|---|---|---|---|---|---|
| 0x0000 | TS1 | LUN 5 | LBA 0 | | | | | |
| 0x0080 | TS2 | LUN 5 | LBA 1 | | | | | |
| 0x0100 | TS3 | LUN 5 | LBA 2 | | | | | |
| 0x0180 | TS4 | LUN 5 | LBA 3 | | | | | |
| ... | ... | ... | ... | | | | | |
| 0xFF00 | TS510 | LUN 5 | LBA 510 | | | | | |
| 0xFF80 | TS511 | LUN 5 | LBA 511 | | | | | |

FIG. 5

METADATA COMPRESSION TECHNIQUES

BACKGROUND

Technical Field

This application generally relates to data processing, and in particular to compressing data having a known structure, format or layout.

Description of Related Art

Data storage systems may include resources used by one or more host systems. Data storage systems and host systems may be interconnected by one or more communication connections such as in a network. These resources may include, for example, data storage devices such as those included in the data storage systems. These data storage systems may be coupled to one or more host systems where the data storage systems provide storage services to each host system. Multiple data storage systems from one or more different vendors may be connected and may provide data storage services for one or more host systems.

A host may perform a variety of data processing tasks and operations. For example, an application may executed on the host and the application may issue I/O (input/output) operations, such as data read and write operations, sent to the data storage system.

Host systems may store data to and/or retrieve data from a storage device included in a data storage system containing a plurality of host interface units, physical storage devices or drives, and physical storage interface units. The storage device may be a logical storage device. The host systems access the storage device through a plurality of channels provided therewith. Host systems may perform read and write operations through the channels to the data storage system and the data storage system provides the data to the host systems also through the channels. The host systems do not address the physical storage devices or drives of the data storage system directly, but rather, access what appears to the host systems as a plurality of logical storage devices or units (which may or may not correspond to the actual physical storage devices or drives). Allowing multiple host systems to access a single storage device allows the host systems to share data of the storage device. In order to facilitate sharing of the data on the storage device, additional software on the data storage systems may also be used.

SUMMARY OF THE INVENTION

Embodiments of the techniques herein include a method, computer readable medium and system for processing metadata (MD). Processing may include determining, in accordance with one or more criteria, a plurality of MD blocks that are similar and expected to have matching corresponding portions of MD in at least some of the plurality of MD blocks. A MD superblock is formed that includes the plurality of MD blocks. Filtering of the MD superblock may be performed to generate a filtered MD superblock. Filtering includes rearranging content of the MD superblock so that a first plurality of MD portions that are similar are grouped together in the filtered MD superblock, wherein at least some of the first plurality of MD portions that are similar are expected to match. The filtered MD superblock may be compressed to generate and a compressed filtered MD superblock.

In at least one embodiment, processing may include storing the compressed filtered MD superblock in a cache. Each of the first plurality of MD portions that are similar may be included in a different one of the plurality of MD blocks. Each of the first plurality of MD portions that are similar may be included in a same MD field in a different one of the plurality of MD blocks. Each of the plurality of MD blocks may have a same defined structure including a plurality of MD fields, and the same MD field may be located at a same logical offset in each of the plurality of MD blocks. The one or more criteria may include spatial locality of user data associated with the plurality of MD blocks. The one or more criteria may include temporal locality of user data associated with the plurality of MD blocks. The one or more criteria may include spatial location of the plurality of MD blocks. The one or more criteria may include one or more characteristics of user data associated with the plurality of MD blocks. The one or more characteristics may include a number of differences between two user data portions of a same MD field described by two of the plurality of MD blocks. Each of the plurality of MD blocks may include a plurality of MD fields.

In at least one embodiment, filtering may include representing the plurality of MD blocks as a matrix. Rows of the matrix may correspond to the plurality of MD blocks and each of the rows may correspond to a different one of the plurality of MD blocks. Columns of the matrix may correspond to a total number of bit positions in each of the plurality of MD blocks. Filtering may include performing a bit-wise transpose of the matrix to obtain a transposed matrix. The transposed matrix may be the filtered MD superblock provided as an input to compression processing performed in said compressing.

In at least one embodiment, processing may include receiving an I/O operation directed to a target location; determining that a first MD block of the plurality of MD blocks is associated with the target location, wherein the target location is included in a logical address range of a logical device having corresponding metadata included in the first MD block; processing the compressed filtered MD superblock to obtain the MD superblock; and subsequent to said processing the compressed filtered MD superblock, obtaining the first MD block from the MD superblock and using the first MD block to service the I/O operation. Processing may include decompressing the compressed filtered MD superblock to obtain a decompressed filtered MD superblock; and subsequent to said decompressing, reverse filtering the decompressed filtered MD superblock to obtain the MD superblock.

BRIEF DESCRIPTION OF THE DRAWINGS

Features and advantages of the techniques herein will become more apparent from the following detailed description of exemplary embodiments thereof taken in conjunction with the accompanying drawings in which:

FIG. 2C is a representation of the logical internal communications between the directors and memory included in one embodiment of the data storage system of FIG. 2A;

FIG. 5 is an example illustrating a MD superblock in an embodiment in accordance with the techniques herein;

DETAILED DESCRIPTION OF EMBODIMENT(S)

Figure 1:
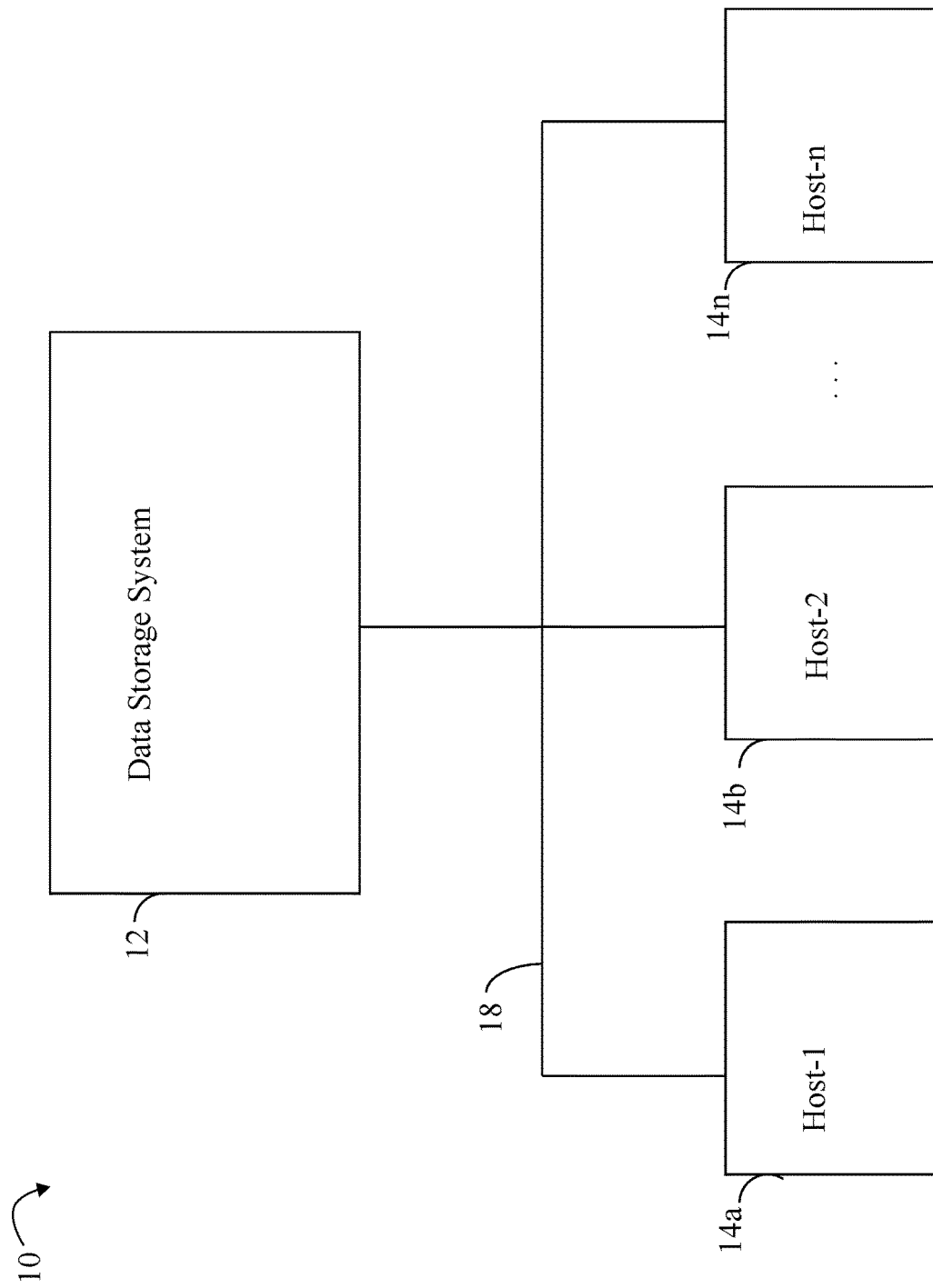
FIG. 1 is an example of an embodiment of a system that may utilize the techniques described herein.

Referring to FIG. 1, shown is an example of an embodiment of a system that may be used in performing the techniques described herein. The system 10 includes a data storage system 12, such as a data storage array, connected to the host systems 14a-14n through the communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connection known in the art. For example, the communication medium 18 may be an intranet, network or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and the data storage system may all be located at the same physical site, or, alternatively, may also be located in different physical locations. The communication medium that may be used to provide the different types of connections between the host computer systems and the data storage system of the system 10 may use a variety of different block-based and/or file-based communication protocols such as TCP/IP, SCSI (Small Computer Systems Interface), Fibre Channel, iSCSI, Fibre Channel over Ethernet, NVMe (Non-Volatile Memory Express) over Fabrics, Network File System (NFS), and the like. Some or all of the connections by which the hosts and the data storage system 12 may be connected to the communication medium 18 may pass through other communication devices, switching equipment that may exist such as a phone line, a repeater, a multiplexer or even a satellite.

Each of the host computer systems may perform different types of data operations. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, as well one or more other data storage systems as may vary with the embodiment.

Figure 2A:
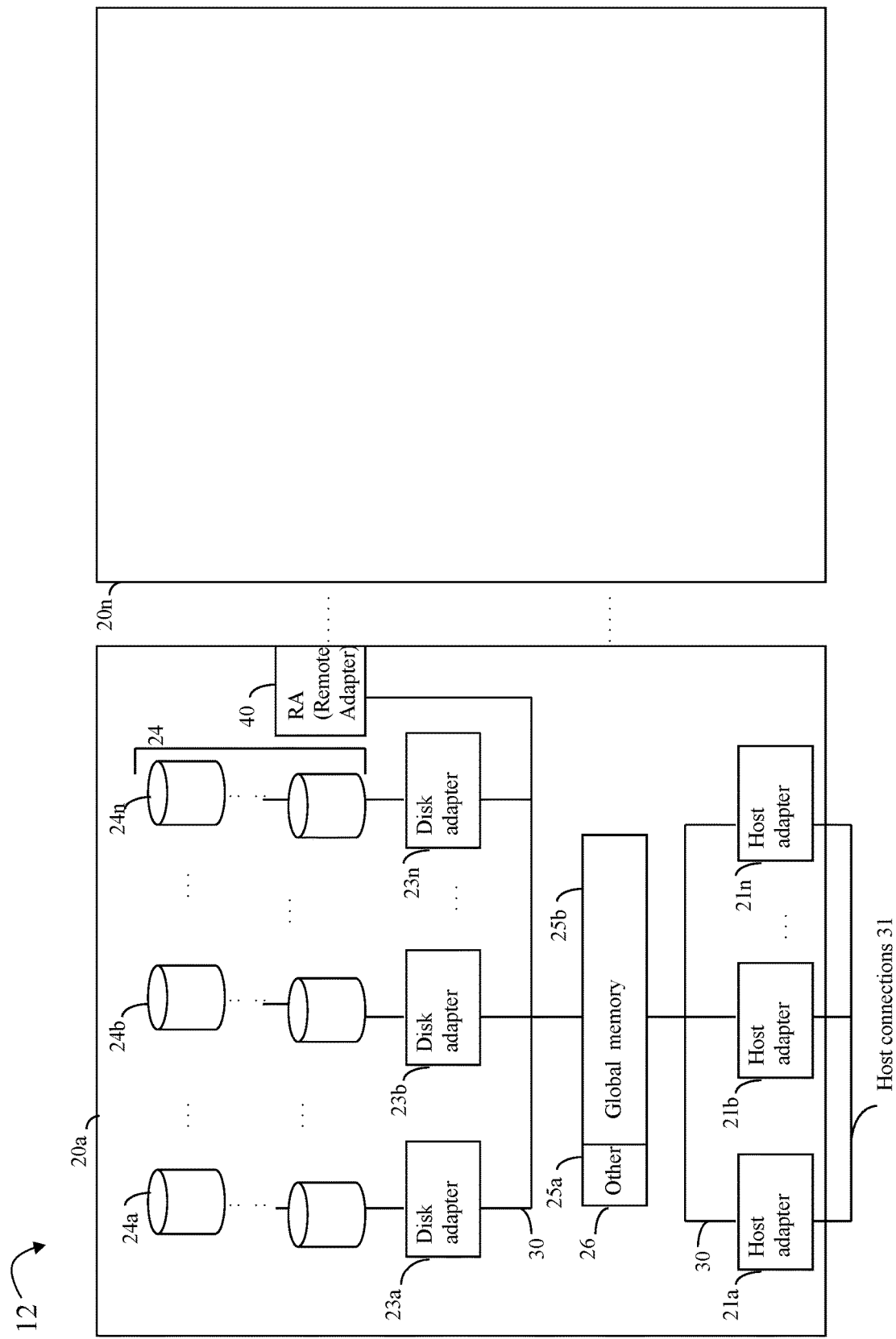
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be interconnected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of the data storage systems 20a-20n may be resources included in an embodiment of the system 10 of FIG. 1 to provide storage services to, for example, the host computer systems. It should be noted that the data storage system 12 may operate stand-alone, or may also be included as part of a storage area network (SAN) that includes other components.

Each of the data storage systems, such as 20a, may include a plurality of disk devices or volumes, such as the arrangement 24 consisting of n rows of disks or more generally, data storage devices, 24a-24n. In this arrangement, each row of the disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system, a backend DA may also be referred to as a disk controller. The DA may perform operations such as reading data from, and writing data to, the physical devices which are serviced by the DA.

It should be noted that, more generally, the physical devices or data storage devices 24a-24n may be any suitable type of physical storage device or media, such as any form of a suitable back-end non-volatile storage device. For example, physical devices included in an embodiment of a data storage system may include one or more types of rotating disk drives (e.g., SATA, SAS, FC 15K RPM, FC 10K RPM), one or more types of flash-based storage devices, or more generally solid state drives (SSDs), such as SSDs that communicate using the NVMe protocol, and the like.

Also shown in the storage system 20a is an RA or remote adapter 40. The RA may be hardware including a processor used to facilitate communication between the data storage systems, such as between two of the same or different types of data storage systems.

The system 20a may also include one or more host adapters ("HAs") or directors 21a-21n. Each of these HAs may be used to manage the communications and data operations between one or more host systems and the global memory. In an embodiment, the HA may be a Fibre Channel Adapter (FA) or other adapter which facilitates host communication. Generally, the directors may also be characterized as the different adapters, such as the HAs (including FAs), DAs, RAs and the like, as described herein. Components of the data storage system, such as an HA, which may communicate with a host (e.g., receive the host I/O commands and send the responses to the host) may also be referred to as front end components. A DA is an example of a backend component of the data storage system which may communicate with a front end component. In connection with the data storage systems, various types of directors or adapters may be implemented as a processor, or, more generally, a component that includes the processor. Examples of directors are DAs, HAs, RAs, and the like, such as described herein.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other the disk adapters or directors, and other components of the system 20a. The other portion 25a is that portion of the memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

The host systems provide data and access control information through channels to the storage systems, and the storage systems may also provide data to the host systems also through the channels. The host systems do not address the disk drives of the storage systems directly, but rather access to the data may be provided to one or more host systems from what the host systems view as a plurality of logical devices or logical units. A logical unit (LUN) may be characterized as a disk array or a data storage system reference to an amount of disk space that has been formatted and allocated for use by one or more hosts. A logical unit may have a logical unit number that is an I/O address for the logical unit. As used herein, a LUN or LUNs may refer to the different logical devices or units of storage which may be referenced by such logical unit numbers. The LUNs may or may not correspond to the actual or physical disk drives. For example, the one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and the LUN(s) residing thereon.

I/O requests, such as read and write requests sent from a host to the data storage system, may be directed to a target address. In at least one embodiment using block storage, the target address may be expressed as a LUN and an offset or location on the LUN. The target address may be mapped or translated into a corresponding physical storage location on physical storage storing the data for the corresponding target address. Such I/O requests from the host may be received by a front end director or adapter, such as the HA or FA described herein. The receiving FA may perform processing to service the I/O operation. Global memory, or a subset thereof, on the data storage system may be used as a cache for storing cached I/O data (e.g., read and write data for I/O received at the data storage system), various metadata (MD), and other information and data used in the data storage system.

The DA physically accesses the back-end non-volatile storage devices, such as the physical data storage devices (PDs) denoted by 24 of FIG. 2A. Data residing on a PD may be accessed by the DA following a data request in connection with I/O operations that other directors originate. In at least one embodiment, write data received at the data storage system from a host or other client may be initially written to a cache memory (e.g., such as may be included in the component designated as 25b) and marked as write pending (WP). Once written to the cache, the host may be notified that the write operation has completed. At a later point time, the write data may be destaged, such as by a DA, from the cache to the physical storage device, such as the non-volatile physical storage devices (e.g., PDs of 24) accessed by the DA.

In connection with reads, processing may be performed by an HA or FA and may include first looking to see if the requested read data is in the cache whereby a read hit occurs. For a read hit, the read may be serviced by the HA or FA using the cached copy of the requested read data by returned the cached read data to the requester. Thus, with a read hit, there is no need to access the physical (back end) non-volatile storage by the DA to obtain the requested read data thereby resulting in a faster read I/O response time (RT). If the requested read data is not in the cache, the requested read data is obtained from the physical (back end) non-volatile storage by the DA where the read data is then stored in the cache, and returned by the FA or HA from the cache to the requester. The cached copy of the read data may then be available to further service any other subsequent reads. As known in the art, any suitable cache management technique may be used to maintain the cache, for example, such as in determining how long data remains in the cache, whether to prefetch data, selecting data stored in the cache for eviction, and the like.

The cache may be partitioned into multiple cache slots each storing different data. For example, in connection with user data such as in connection with read and write operations, for each cache slot including cached user data, the cache may also include information about the user data cached in the particular cache slot. For example, for each cache slot, information stored in the cache may include flags denoting state information for the cached data (e.g., whether the cached data is WP), a logical address on a LUN of the cached data, and the like.

In connection with at least one embodiment using the techniques herein, each processor or CPU may include its own private dedicated CPU cache (also sometimes referred to as processor cache) that is not shared with other processors. In at least one embodiment, the CPU cache, as in general with cache memory, may be a form of fast memory (relatively faster than main memory which may be a form of RAM). In at least one embodiment, the CPU or processor cache is on the same die or chip as the processor and typically, like cache memory in general, is far more expensive to produce than normal RAM such as may be used as main memory. The processor cache may be substantially faster than the system RAM used as global memory, or generally, main memory, and contains information that the processor will be immediately and repeatedly accessing. The faster memory of the CPU cache may, for example, run at a refresh rate that's closer to the CPU's clock speed, which minimizes wasted cycles.

Figure 2B:
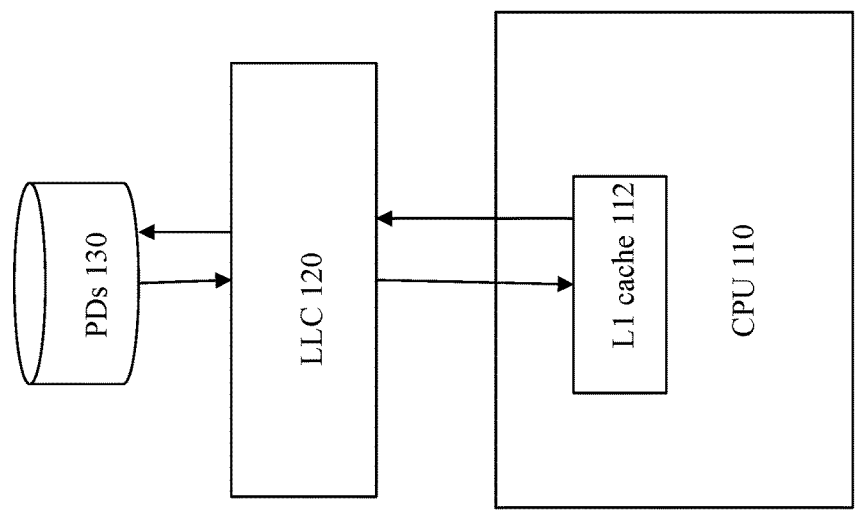
FIG. 2B is an example illustrating a hierarchical cache that may be included in one embodiment of the data storage system of FIG. 2A.

In at least one embodiment, there may be two or more levels (e.g., L1, L2 and L3) of cache forming a hierarchical cache. With reference now to FIG. 2B, the CPU or processor 110 may include at least an L1 level cache 112 that is the local or private CPU cache dedicated for use only by that particular processor 110. The L1 level cache 112 may be further characterized as non-shared cache that is only used by the particular single CPU 110. The two or more levels of cache in a system may also include at least one other lower level of cache (LLC) 120 that is shared among the different CPUs and other components in a system. The L1 level cache 112 serving as the dedicated CPU cache of a processor 110 may be the closest of all cache levels (e.g., L1-L3) to the processor 110 which stores copies of the data from frequently used main memory locations. Thus, an embodiment in accordance with techniques herein may use multiple caching levels including the CPU cache that is the L1 level cache 112 (e.g., dedicated private CPU cache) as well as one or more other lower level caches denote by the LLC 120 (e.g., L2-L3 caches). Consistent with other discussion herein, portions of the LLC 120 may be used, for example, to initially cache write data which is then flushed to the backend physical storage denoted by the PDs 130. For example, in at least one embodiment, the CPU cache may be used as the L1 level cache 112 and a portion of the global memory, such as used to cache read and write I/O data, may be used as the L2 level cache of the LLC 120.

Referring to FIG. 2C, shown is a representation of the logical internal communications between the directors and the memory included in a data storage system. Included in FIG. 2C is a plurality of directors 37a-37n coupled to the memory 26. Each of the directors 37a-37n represents one of the HAs, RAs, or DAs that may be included in a data storage system. Each of the directors may be, for example, a processor or a printed circuit board that includes a processor and other hardware components. The representation of FIG. 2C also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional technology, such as using multiplexers, switches and/or routers, where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

A host may be able to access data, such as stored on a LUN of a data storage system, using one or more different paths from the host to the data storage system. A data storage system device, such as a LUN, may be accessible over multiple paths between the host and data storage system. Thus, a host may select one of possibly multiple paths over which to access data of a storage device.

It should be noted that the particular exemplary architecture of a data storage system such as, for example, in FIGS. 2A, 2B and 2C is merely illustrative of one such architecture that may be used in connection with the techniques herein. Those skilled in the art will appreciate that the techniques herein may be used with any suitable data storage system. For example, FIG. 2C provides an example of components that may be included in a separate physical fabric used for control communications sent between components of the data storage system. Some embodiments may use separate physical fabrics for each of data movement and control communications between data storage system components. Alternatively, some embodiments may use a same shared physical fabric for both data movement and control communication functionality rather than have a separate control communications fabric such as illustrated in FIG. 2C.

In an embodiment of a data storage system in accordance with the techniques herein, the components such as HAs, DAs, and the like may be implemented using one or more "cores" or processors.

It should be noted that although examples of the techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

In an embodiment in accordance with techniques herein, the data storage system may be characterized as having one or more logical mapping layers in which a LUN of the data storage system is exposed to the host whereby the LUN is mapped by such mapping layers of the data storage system to one or more physical devices. Additionally, the host may also have one or more additional mapping layers so that, for example, a host side logical device or volume is mapped to one or more data storage system LUNs as presented to the host.

The data storage system may provide various data services. For example, in at least one embodiment in accordance with the techniques herein, a data storage system may provide one or more data reduction services in efforts to reduce the size of the compressed data that may be stored, for example, in memory, in cache, or on the backend non-volatile storage PDs of the data storage system. In at least one embodiment, the data reduction services may include compression. In at least one embodiment, compression of user data stored on the data storage system may be performed inline when processing an I/O operation as part of the data path or I/O path, described below. Compression of user data stored on the data storage system may also be performed offline, or more generally, not part of the I/O path when servicing a data operation. In at least one embodiment, the data services may include local and/or remote data replication services.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receiving a response (possibly including requested data) in connection such I/O commands. Generally, a data storage client may be an external client with respect to the data storage system or may be an internal client within the data storage system. The host, or more specifically application executing on the host, that issues I/O operations is one example of an external client. Software executing on the data storage system, such as to perform a data service, is an example of an internal client. More specific example of internal clients include, for example, a data storage optimizer, a data replication service, a data reduction service, a data backup service, and the like.

The data path or I/O path may be contrasted with a control path. The data or I/O path and control path define two sets of different logical flow paths. The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to the FIG. 1, the control commands may be issued from data storage management software executing on a management system, such as another computer system or other device with a processor that is connected to the data storage system 12. Such commands may be, for example, to establish or modify data services; view performance or health of various system components and storage entities; provision storage; perform user account management; and the like.

Figure 3:
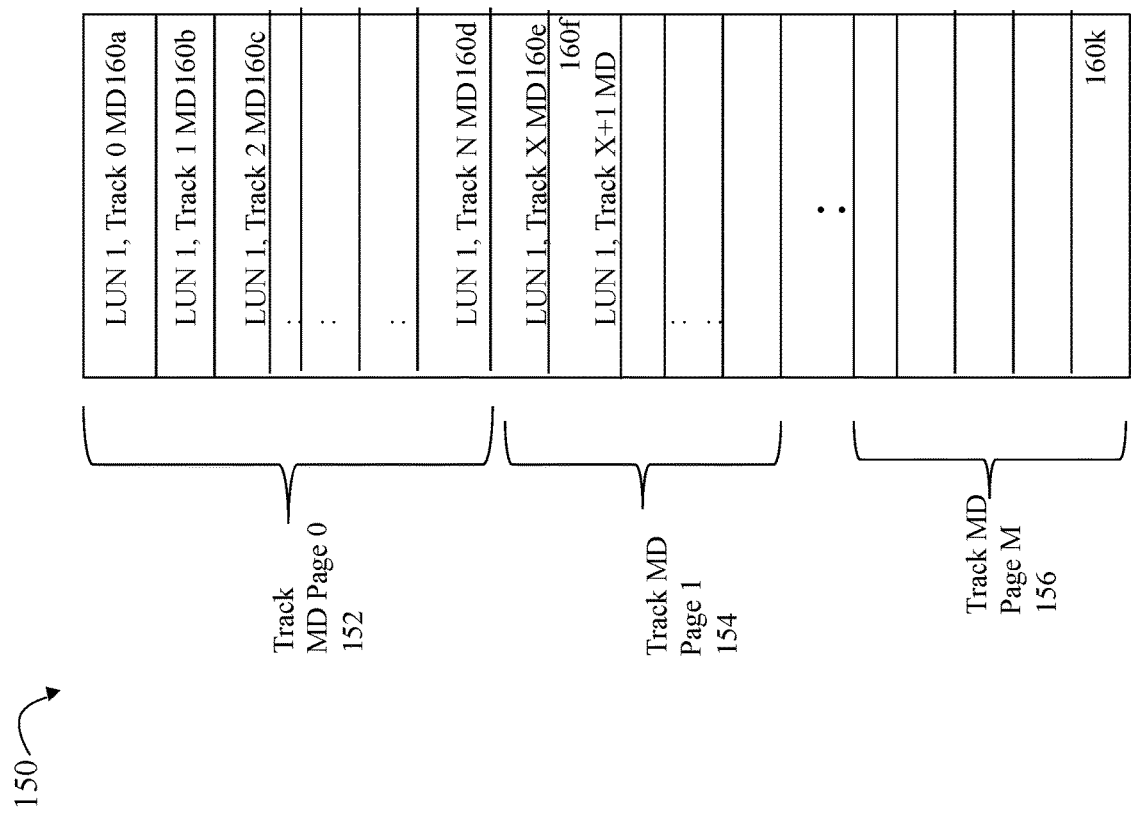
FIG. 3 is an example arrangement of pages of MD that may be used in an embodiment in accordance with the techniques herein.

Referring to FIG. 3, shown is an example of MD that may be used in an embodiment in accordance with techniques herein. In one embodiment, the user data, or more generally data stored on LUNs having storage provisioned from PDs of the data storage system, may be arranged in units of storage, such as tracks of a LUN. Each track is of a particular size, such as 128K bytes of user data per track. For each track, there may exist user data and associated MD. In the example 150, MD may be maintained for each track of a LUN whereby, for example, I/O operations from a host may be directed to a logical block address (LBA) or offset denoting a particular track on the LUN. In this case, the data storage system uses MD for the track in connection with servicing the I/O operation. The example 150 illustrates a logical structure or arrangement including an entry for the MD per track. It should be noted that the track and examples of particular track size as described herein are merely illustrative of one particular unit of storage that may be used in an embodiment in accordance with techniques herein. More generally, an embodiment may use any suitable size and type of storage unit to denote a logical offset, address, location, and the like, on a LUN (e.g., whereby data may be stored at the logical offset, address location, and like, on the LUN).

In connection with examples herein for purposes of illustration, each track may correspond to single LBA. More generally, depending upon the size of a track and a single LBA in an embodiment, each track may correspond one or more LBAs, and each LBA may correspond to one or more tracks.

The MD maintained per track or LBA of a LUN may include information used by front end data storage components, such as the FA or HA, as well as the back end data storage system components, such as the DAs. For example, the MD for a track of a LUN may include:

1. Location information. Location information may include, for example, the physical device storage location denoting where the user data is stored on physical storage such as disks or flash-based non-volatile storage. Consistent with discussion herein, the data storage system may receive a host I/O that reads or writes data to a target location expressed as a LUN and an LBA (denoting a track number or offset) on the LUN. The target location is a logical LUN address that may map to a physical storage location where data stored at the logical LUN address is stored. Thus, one type of MD for a track of a LUN may include location MD identifying the physical storage location mapped to the track. Location information may include, for example, cache location information denoting if the track's user data is stored in cache and if so, identify the location in the cache where the user data is stored.

2. Data Description. Data description information may include, for example, a checksum value, CRC (cyclic redundancy check) value or other information describing the user data stored on the LUN track. For example, the checksum may be used to verify or validate the user data's validity when read from physical non-volatile storage, for example, to ensure there has not been user data corruption or error in connection with obtaining the user data from the physical storage. Use of a checksum value in data validation and error detection is known in the art. A checksum is a count of the number of bits in a transmission unit that is included with the unit so that the receiver can check to see whether the same number of bits arrived. If the counts match, processing may determine that the complete transmission was received and there has been no error in the data transmitted.

A CRC (cyclic redundancy check) value for a data block is another type of value that may be used in connection with detecting and correcting errors or inconsistencies in a data block. A CRC is typically attached to the data during data transmission. The CRC is generally based on division where the input data block is interpreted as a binary bit stream (e.g., dividend) that is divided by another fixed binary number (e.g., divisor). The remainder of this division is the checksum value. The binary numbers used as the dividend and divisor are treated as binary polynomials where the bits of such binary numbers are used as coefficients of the polynomials. The divisor may also be referred to as a generator polynomial that is statically defined using the CRC algorithm, where CRC-n denotes use of a fixed defined generator polynomial with "n+1" bits. Generally, the CRC may be defined as the remainder after repeatedly performing XOR operations using the generator polynomial or divisor. Thus, an existing CRC value may be stored in the MD such as when writing the user data. Subsequently, for example, when the user data is read from a PD such as when servicing a read miss, the user data obtained from the PD may be used to again calculate a CRC value based on the user data read. If the calculated CRC value does not match the existing CRC value of the MD, there is an inconsistency, such as a data corruption, of the user data read from the PD as compared to the version of the user data as previously written to the PD.

The data description information may also include the LUN identifier and associated LBA or offset denoting the particular track of the user data associated with this particular set of MD.

The data description information may also include one or more fields based on the date and/or time of last access. For example, in at least one embodiment, the MD for a LUN track may include a timestamp encoding the date (e.g., month, day and year) and time (e.g., such as in hours minutes, seconds and possibly smaller units of time) of last access. As a variation, an embodiment may include a separate date field and as separate time field, where the date field may encode the date, such as year, month and day of last access, and the time field may encode the time of day of the last access, such as based on a time within a 24 hour period. For example, the date field may indicate the date of last access was on May 5, 2019 and the time field may indicate the time of last access was at 9:00:00 a.m. In at least one embodiment, the MD for each track of user data may include a timestamp that is a 32 or 64 bit counter denoting an amount of time that has elapsed since some defined starting point in time, such as since the last reboot or reset, or since a fixed date, such as Jan. 1, 2019.

3. Advanced functionality. Advanced functionality MD may relate to other data facilities or services. For example, an embodiment may support remote data replication such as, for example, the Symmetrix Remote Data Facility (SRDF®) products provided by EMC Corporation of Hopkinton, Mass. SRDF® is a family of products that facilitates the data replication from one Symmetrix® storage array to another through a Storage Area Network (SAN) or and IP network. SRDF® logically pairs a device or a group of devices from each array and replicates data from one to the other synchronously or asynchronously. Generally, the SRDF® products are one example of commercially available products that may be used to provide functionality of a remote data facility (RDF) for use in an embodiment in connection with techniques herein.

Data storage device communication between Symmetrix™ data storage systems using the SRDF® product is described, for example, in U.S. Pat. Nos. 5,742,792, 5,544, 347, and 7,054,883, all of which are incorporated by reference herein. With the SRDF® product, a user may denote a first storage device, such as R1, as a master storage device and a second storage device, such as R2, as a slave storage device. Other incarnations of the SRDF® product may provide a peer to peer relationship between the local and remote storage devices. For example, the host may interact directly with the device R1 of first local data storage system, but any data changes made are automatically provided to the R2 device of a second remote data storage system using the SRDF® product. In operation, the host may read and write data using the R1 volume in the first data storage system, and the SRDF® product may handle the automatic copying and updating of data from R1 to R2 in second remote data storage system. The SRDF® replication functionality may be facilitated with the RAs provided at each of the foregoing first and second data storage systems. Performing remote data communications using the SRDF® product over a TCP/IP network is described in more detail in U.S. Pat. No. 6,968,369, Nov. 22, 2005, Veprinsky, et al., REMOTE DATA FACILITY OVER AN IP NETWORK, which is incorporated by reference herein.

The advanced functionality MD for LUN track may denote, for example, whether the user data stored on the LUN track is replicated by a data facility such as the SRDF® product, whether the remote or replication copy of the user data is valid or up to date with the primary location copy of the user data, and the like.

Generally, the advanced functionality MD may also include MD about other data facilities or services, for example, regarding snapshots (e.g., such as whether data of a particular track/LUN is a snapshot or serves as a base data copy of which a snapshot is taken), compression (e.g., whether data of the track/LUN is compressed), deduplication, and the like.

In at least one embodiment, at least some of the above-noted types or categories of MD, such as the location information MD and the checksum or CRC or other information of the data description MD, may be stored per track as illustrated in FIG. 3. Each per track MD may be needed in connection with servicing I/O operations and may be stored in a form of fast memory or storage. For example, an embodiment may store MD (e.g., location information MD, CRC or checksum and other MD information used for data validation) for as many data tracks as possible in the cache, such as global memory of the data storage system. Thus, storing the MD in cache or other form of fast storage provides for obtaining needed MD, such as location MD, in a timely manner to service I/O operations and other processing in connection with the associated user data.

The example 150 illustrates per track MD as just described. Element 152 denotes that MD for a first set of tracks is stored in page 0 of the cache. Element 154 denotes that MD for a second set of tracks is stored in page 1 of the cache. Element 156 denotes that MD for an Mth set of tracks is stored in page M of the cache.

Generally, the amount of MD describing all user data, such as stored on LUNs configured in a data storage system, is large in size. Modern storage systems are capable of storing a large amount of user data and therefore a large amount of MD is needed to describe such user data. Additionally, the complexities of the modern data storage system, such as due to the available data services, may define a feature set requiring a lot of MD to describe each user data track. In some cases, the amount of user data and associated MD make it impractical to store all MD for all user data in the cache. In other words, the size of the cache is typically smaller than the amount of storage needed to store all the MD along with storing other necessary data in the cache. In this case, a data storage system may use a paging mechanism for storing MD in the cache in order to reduce the amount of cache consumed with storing the MD.

Paging is generally known in the art and commonly used in connection with memory management, such as for virtual memory management. In connection with virtual memory management, paging is a method of writing data to, and reading it from secondary storage, such as physical disk or other non-volatile storage, for use in primary storage, such as main memory. In a memory management system that takes advantage of paging, the operating system reads data from secondary storage in blocks or chunks that may also be referred to as pages. Since the amount of the primary storage is typically much smaller than the amount of data on secondary storage, it is not possible to store all such data in the primary storage. Thus, data may be read from secondary storage and stored in the primary storage as needed. When the primary storage no longer has available locations and another primary storage location is needed for storing new or additional data not already in primary storage, techniques may be used to select a primary storage location whereby any data in the selected primary storage location may be overwritten with the new or additional data. Prior to over-writing the selected primary storage location with the new or additional data, the current data of the selected primary storage location may be written out, as needed, to its corresponding secondary storage location (e.g., written out if the primary storage location copy is more recent or up to date than the secondary storage copy). In such a case, the current data in the selected primary location may be characterized as paged out of the primary memory (e.g., available on secondary storage but not primary storage) and the new or additional data may be characterized as paged in to the primary memory. The new or additional data is also stored on the secondary storage.

In connection with storing MD in the cache, paging may be performed in a similar manner where the primary storage is the cache and the secondary storage is the physical storage device (e.g., disk or flash-based non-volatile backend storage accessed by the DAs). Thus, MD may be retrieved from back-end physical storage as needed and stored in the cache, such as for servicing read operations requesting user data associated with the MD. Once the MD is in cache, such MD may be removed from cache (e.g., evicted, removed, overwritten, paged out, and the like) as cache locations storing such MD are needed in connection with other subsequent processing. A page may refer to a single unit or amount of memory located in the cache, whereby MD stored in each page in the cache may be brought into the cache (e.g., paged into the cache) and also paged out of (e.g., evicted from) the cache as may be needed. Various techniques may be used for general cache management (e.g., eviction policy for selecting data of cache slots for removal from cache, flushing policy for determining when and/or how much write pending data to flush from cache to non-volatile storage, and the like).

It should be noted that storing the MD on back-end physical storage, that is read and/or written to by the DA, is one possible way in which an embodiment in accordance with techniques herein may store and access MD on a form of non-volatile storage. More generally, an embodiment may store the MD on any form of non-volatile storage and access such MD as needed in any suitable manner.

Referring again to FIG. 3, the example 150 illustrates per track MD such as may be used in connection with performing I/O operations and other processing in connection with data stored on each particular track of a LUN. Also illustrated in 150 are track MD pages 102, 104 and 106 where each track MD page includes per track MD for a specified (e.g., an integer number) of tracks. The example 150 illustrates a logical set of pages including per track MD for a single LUN. In a similar manner, a different set of one or more track MD pages may include per track MD for each LUN in the system. Although the set of one or more pages 150 including a LUN's track MD may be logically viewed as a sequence of contiguous pages, each of the track MD pages may be physically located in contiguous or non-contiguous locations in cache and also non-volatile storage.

In at least one embodiment, additional information for each LUN may also be stored in the cache. Such additional information may include, for example, a per LUN MD object identifying the particular number of pages including track MD for each LUN. For example, a first LUN MD object for LUN $_1$ may indicate that M track MD pages (152-156) include track MD for LUN1. The M pages containing the LUN's MD may store the MD for tracks of the LUN based on sequential ordering of the tracks. The sequential ordering of per track MD for a LUN may facilitate locating MD of particular tracks of the LUN within the logical representation of the pages as in 150. Additionally, viewing the collective M pages as a contiguous logical representation, the MD of a particular track of a LUN may be expressed, for example, using a page number and logical offset or location within the page identified by the page number. In at least one embodiment, each page of track MD may include MD for only a single LUN (e.g., no page of track MD includes MD from 2 different LUNs).

In at least one embodiment, a page table may be used to map a logical page and offset (e.g, such as a track MD page and offset) to its corresponding physical memory location in the cache (e.g., map a page number and offset to a corresponding cache address or physical page frame number and offset in the cache). In at least one embodiment the page table may store the cache address of the physical page frame number and may not explicitly store the track offset within the page frame since it is straightforward to calculate the offset based on a constant or fixed number of tracks per page with a fixed size set of MD stored per track.

Since not all MD for all tracks of all LUNs may be stored in the cache, an I/O operation to read or write user data to a LUN track may be received where the necessary MD for the LUN track is not in the cache. As such, it may be necessary to page in (i.e., from back-end non-volatile storage to the cache) the MD for the particular track of a LUN in order to service the I/O operation. Paging in the MD when servicing the I/O inline as part of the data or I/O path increases the I/O latency and RT. However, as noted above, due the large amount of the MD for all tracks of all LUNs in the system and the limited amount of available cache, not all such MD may be stored in the cache and not all such MD may remain in the cache.

Described in following paragraphs are techniques that may be used to dynamically reduce the size of the MD, such as maintained for the tracks of LUN user data in the data storage system, without adversely impacting the performance of reading and writing the MD pages. Such reduced size of the MD pages provides the further ability to store additional MD pages in the cache and generally reduce the amount of cache needed for storing the MD. The techniques in following paragraphs perform compression of the MD stored in the cache achieving a high compression ratio. The techniques take advantage of the known structured arrangement of the MD and apply blocking and filtering techniques to the MD prior to performing compression of the blocked and filtered MD.

To reduce or avoid any adverse performance impact, at least one embodiment may take advantage of the blocking technique where the MD is partitioned into blocks where each block fits into the L1 or CPU cache. In at least one embodiment, the blocking technique may include partitioning the MD into superblocks, where each such superblock may be the size of the L1 or CPU cache. In at least one embodiment, where a single MD structure or block refers to the single set of MD per track of user data, blocking includes selecting MD blocks which are determined to be similar. Such similar MD blocks may be expected to have matching or similar content stored in corresponding MD fields. More generally, similar MD blocks may be expected to have at least some matching corresponding MD portions.

Higher compression ratios are achieved by leveraging the structured nature of the MD blocks and applying a filtering technique. The filtering technique generally relies on neighboring MD blocks or structures included in the same superblock to be similar or highly correlated. For example, such MD blocks in the same superblock are similar and thus expected to have at least some matching corresponding MD portions. For example, the content of a particular MD field in at least some of the MD blocks of a superblock may be expected to exactly match one another or may be expected to partially match one another (e.g., where a portion of less than all the content or bits of the MD field match across at least some of the MD blocks of the superblock). In at least one embodiment, the filtering technique includes determining similar MD portions within the same superblock and grouping such similar MD portions together in the superblock. For example a first set of MD portions from different MD blocks in the superblock may be determined as similar. The first set of MD portions may be included in neighboring or consecutive logical locations within the superblock. For example, the first set of MD portions may be included consecutively in the same row within the superblock structure where, for example, the superblock structure will be subsequently processed by a compression technique sequentially row by row. Thus, the data stream provided to the compression technique may be viewed in one embodiment as a sequential concatenation of the consecutive rows of the superblock. In at least one embodiment, one goal of filtering is to group similar MD portions, such as those expected to match exactly or partially, together in consecutive locations of the data stream subsequently provided to the compression technique. As discussed elsewhere herein, the compression technique selected for use in an embodiment may be expected to achieve higher compression ratios due to such grouping of similar MD portions in close proximity to one another, such as within a specified window or distance in the data stream, consecutive locations in the data stream, and the like.

In at least one embodiment in accordance with the techniques herein, a lossless data compression technique may be used. As known in the art, a lossless data compression technique allows the original data to be perfectly reconstructed from the compressed data. In at least one embodiment, the lossless compression technique may be an algorithm from the Lempel Ziv (LZ) algorithm family such an algorithm from the LZ77 class of encoders, such as LZ4, LZ77, LZRF, and the like. LZ77 encoders, as well as other compression techniques that may be utilized, compress data by searching for repeated sequences of bytes in the uncompressed data stream. When a sequence that occurs earlier in the stream is found later in the stream, later reference in the stream is replaced with a reference to the earlier or prior occurrence. The reference may be denoted by a pair of tokens representing the length of the sequence and the location of the prior occurrence, where the location may be represented by an offset from the present location (of later reference). Thus, such compression algorithms such as the LZ77 class of encoders are an example of a lossless compression algorithm that exploits data redundancy and benefits from having matching sequences or multiple occurrences of the same sequence within the same single analyzed compression unit.

In at least one embodiment in accordance with the techniques herein applying the combination of the filtering and the blocking with compression processing using LZ4 to the MD, the inventors achieved a 98% reduction in overall MD size with no adverse performance impact.

The foregoing and other aspects of the techniques herein are discussed in more detail in connection with following paragraphs and figures.

Figure 4:
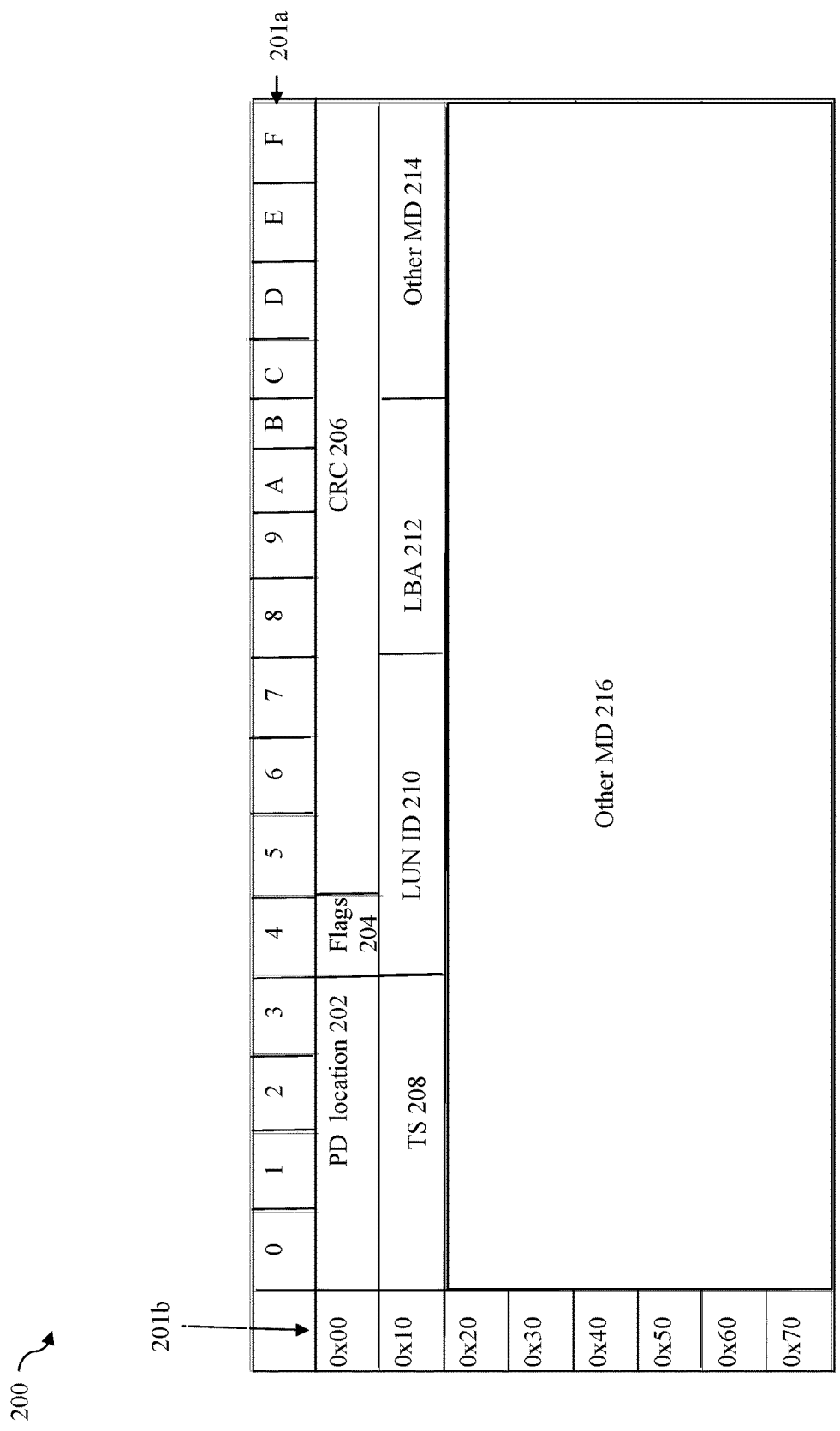
FIG. 4 is an example illustrating a layout of a MD block that may be used in an embodiment in accordance with the techniques herein.

Referring to FIG. 4, shown is an example illustrating a MD structure that may be used in an embodiment in accordance with the techniques herein. The example 200 denotes the MD structure or MD block that may be maintained per individual track of a LUN. For example, the MD structure 200 provides more detail regarding the layout of the particular MD fields in each of the entries of 160a-k of the FIG. 3. In the example 200, the MD structure is 128 bytes with each row denoting 16 bytes of the layout. Element 201a denotes the hexadecimal digits 0-F. Element 201b denotes the hexadecimal offsets beginning each row of the MD fields in the layout of the MD structure 200. The example 200 includes some example MD fields that may be included in each MD structure 200 for purposes of illustration using the techniques herein. However, more generally, any MD field may be included the MD structure 200.

As often used in the art and herein, for an occurrence of "0xN", "0x" is used as prefix notation to denote that "N" is a value in hexadecimal. In the example 200:

bytes 0x0-0x3 include the PD location 202 denoting where the associated user data is stored on backend non-volatile physical storage (e.g., PDs of the data storage system);

byte 0x4 is a flag field including various bit flag settings that may be used for a track;

bytes 0x5-0xF is a CRC field 206 with a CRC value used for detecting and correcting data inconsistencies;

bytes 0x10-0x13 is a timestamp (TS) field 208 including a timestamp value as described elsewhere herein;

bytes 0x14-0x17 is a LUN ID (identifier) field 210 including the LUN ID of the user data associated with this MD structure instance;

bytes 0x19-0x1B is an LBA field 212 including the offset or LBA location of the user data associated with this MD structure instance;

bytes 0x1C-0x1F is another MD field 214 generally including any other MD that may be used in an embodiment; and bytes 0x20-0x7F is yet another MD field 216 generally including any other MD that may be used in an embodiment.

It should be noted that in this particular example as noted elsewhere herein, a single track may map to a single LBA as denoted by the LBA field 212. As a variation, an embodiment in which a single track corresponds to multiple LBAs of the same LUN where the multiple LBAs form a consecutive LBA range, the LBA field 212 may denote the starting offset of the implied, fixed LBA range.

Generally, the MD structure 200 denotes the layout of each of the MD blocks or sets of MD for corresponding tracks of a LUN storing user data. Thus the format and layout of each MD block or structure for each track of user data stored on a LUN is known and may be used for interpreting the content stored in all MD block or structure instances.

Consistent with discussion herein, blocking is performed in a first step in which multiple MD blocks or structures are combined into a single superblock, where the single superblock fits into the L1 or CPU cache. In at least one embodiment, each superblock may be equal to the size of the L1 or CPU cache. However, more generally, each superblock should be no larger than the size of the L1 or CPU cache. In connection with the example MD structure of FIG. 4 that is 128 bytes, consider an L1 cache that is a private dedicated cache used by only a single designated CPU, or more generally processor. The L1 cache may be 64 KB (i.e., 64*1024=65,536 bytes) in size. Thus, in such an embodiment, each superblock is 64 KB and includes 512 MD blocks, where each MD block or structure is 128 bytes. In one aspect, a single superblock is a concatenation of 512 MD blocks or structures for 512 tracks of user data.

With reference to FIG. 5, shown is an example 300 illustrating a single superblock in at least one embodiment in accordance with the techniques herein. The superblock, also referred to as a MD superblock, is formed from 512 MD blocks or structures, such as 512 instances of the MD structure of FIG. 4. Thus, in the example 300, each row of the superblock corresponds to a single MD block or structure of FIG. 4. Element 301b denotes the hexadecimal offsets beginning each row of the superblock denoting the starting offset within the superblock of a next MD block. For example, the offset 0x000 denotes the starting offset within the superblock for the first MD block or structure for a first user data track; the offset 0x0080 denotes the starting offset within the superblock of the second MD block for a second user data track; and the offset 0xFF80 denotes the starting offset of the last MD block, MD block number 512, within the superblock for the 512$^{th}$ user data track.

Generally, the blocking technique performed in the first step leverages the L1 cache that is a dedicated CPU cache as described herein. The blocking technique exploits spatial and temporal localities of the superblocks of MD by arranging each contiguous superblock of MD that fits into the L1 cache at each memory access, then operates upon it, and reuses it before writing the MD superblock back to memory. Thus, each superblock may be formed to selectively include particular MD blocks that exploit such spatial and temporal localities during processing performed to the superblock.

Generally, for any data set having spatial locality, the data set may be accessed sequentially from memory. The data set elements may be stored at sequential memory locations. For any data set having temporal locality, the data set is reused several times over a short period. Thus, temporal locality refers to the reuse of specific data within a relatively small time duration, and spatial locality refers to the use of data elements within relatively close or nearby storage locations. With spatial locality as applied to processing performed on a superblock, the MD of the superblock may be accessed sequentially during such processing.

Additionally, the principle of spatial locality and the known structure and fields of the MD block may be used in selecting what MD blocks to include in the same superblock. For example, the spatial locality of the logical addresses of the tracks of user data may be used to infer an expected similarity of the MD blocks associated with the tracks of user data. Such selected MD blocks may be similar and expected to have at least some matching MD content. Based on spatial locality, a MD superblock may include MD blocks identified based on nearby logical addresses (e.g., a consecutive or contiguous sequence of the logical addresses of the same LUN, logical addresses within a predetermined logical address range of the same LUN) of the user data tracks described by the MD blocks and also based on one or more particular MD fields (e.g., LUN ID, LBA) included in the MD blocks. The particular MD fields may include content based on the logical addresses of the associated user data. The particular MD fields of the MD blocks may be expected to have at least some matching content when the user data tracks described by the MD blocks exhibit spatial locality. Thus the spatial locality may be based on consecutive or nearby logical addresses of the tracks of user data associated with the MD blocks or structures included in the same MD superblock. Such spatial locality of the logical addresses of the user data tracks represented by the MD blocks may be used to select a group of MD blocks that are similar and expected to have at least some matching MD content in the particular MD fields.

With temporal locality as applied to processing performed on a superblock, the MD of the superblock may be reused several times over a short period when performing processing of the superblock. The first time the MD superblock is accessed, it is loaded from a slower form of memory or storage to the L1 cache. Once the MD superblock has been loaded into the L1 cache, the processor is able to fetch the MD superblock more directly and quickly from the L1 cache as needed for subsequent processing of the data.

Additionally, the principle of temporal locality and the known structure and fields of the MD block may be used in selecting what MD blocks to include in the same superblock. For example, the temporal locality of the logical addresses of the tracks of user data may be used to infer an expected similarity of the MD blocks associated with the tracks of user data. Such MD blocks may be similar and expected to have at least some matching MD content. Based on temporal locality, a MD superblock may include MD blocks identified based on logical addresses of the user data associated with the MD blocks and also based on one or more particular MD fields (e.g., TS field) included in the MD blocks. The particular MD fields of the MD blocks may include content based on the temporal locality of the associated user data. The particular MD fields of the MD blocks may be expected to have at least some matching content when the user data tracks described by the MD blocks exhibit temporal locality. Thus the temporal locality may be based on the particular tracks of user data referenced within the same defined window of time. The specified window of time may be of any suitable amount of time. The MD blocks associated with the tracks of user data referenced within the same defined window of time may be included in the same MD superblock. Such temporal locality of the logical addresses of the user data tracks represented by the MD blocks may be used to select a group of MD blocks that are similar and expected to have at least some matching MD content in the one or more particular MD fields.

Thus, the blocking performed in the first step includes forming MD superblocks, where each such superblock includes MD blocks that are similar. MD blocks that are similar, and thus included in the same MD superblock, may be determined using one or more criteria including spatial locality and temporal locality of the MD blocks and also the known MD structure and layout, such as illustrated in FIG. 4. As noted above, the spatial and temporal locality may be based on the user data associated with the MD blocks. More generally, characteristics of the user data associated with the MD blocks may be used to infer similarity of the MD blocks. Similar MD blocks are expected to have at least some common or matching MD content among the MD blocks.

The specified criteria used to determine whether MD blocks or structures are similar, and therefore expected to have at least some matching MD portions, may include spatial locality as noted above. Such spatial locality may be based on the logical addresses of the tracks of user data associated with the MD blocks or structures. Thus, the spatial locality criteria may be based on logical proximity or distance of locations of the user data in a logical entity, such as user data stored at logical locations or offsets on the same LUN. For example, multiple tracks of data which are located at multiple LBA offsets of the same LUN, where the multiple LBA offsets are near each other, such as where all LBA offsets are within a specified LBA range, or where all LBA offsets form a contiguous range, have spatial locality of reference. As such, the group of MD blocks or structures of the multiple tracks of data having the spatial locality are expected to include at least some matching MD between the MD blocks of the group. In particular, with reference to the MD block fields of FIG. 4, MD blocks describing tracks of user data located on the same LUN and having LBA offsets within the same specified range are expected to have at least some matching MD content in the MD blocks.

The specified criteria used to determine whether MD blocks or structures are similar, and therefore expected to have at least some matching MD portions, may include temporal locality as noted above. Tracks of user data accessed, such as via I/O operations, at the same time, or within some specified time period, may be related to each other in terms of temporal locality. In at least one embodiment, each time user data within a particular track is accessed, a TS value as described herein, such as denoting a date and time of the access, may be recorded within the TS field 208 of the MD block associated with the track of data. The TS may denote the last or most recent time at which user data of the track was accessed. In this manner, those tracks having temporal locality are also expected to have similar TS values indicating a date/time within the same specified time period or time window. For example, a first set of tracks of user data stored on one or more LUNs may represent data blocks of the same first file accessed within a specified time period. Thus, the user data tracks of the first set may be characterized as having temporal locality. As such, the group of MD blocks or structures describing the first set of tracks of data having the temporal locality are expected to include at least some matching MD between the MD blocks of the group. In connection with the TS values for the MD blocks of the group, the last time of access of all such associated user data tracks of the first set may be on the same date whereby the date portion of the TS indicating the month, day and year, is expected to be the same in all such MD blocks of the group. Further, at least some portion of the time or time of day indicated by the TS may be expected to match among all MD blocks of the group.

In at least one embodiment, similarity of a group of MD blocks or structures may be inferred based on the temporal locality, such as observed access times, of the corresponding user data tracks. For example, processing may record which tracks of user data are accessed within a specified time period or window whereby the MD blocks for such accessed tracks are expected to include at least some matching MD between at MD blocks of the group.

In connection with discussion above, provided are examples of criteria that may be used to determine MD blocks or structures that are similar to each other and expected to include at least some matching MD content. The foregoing spatial locality and temporal locality are examples of two types of criteria that may be used to identify a group of MD blocks or structures that are expected to include at least some matching MD between at least some MD blocks of the group. The specified criteria may include, for example, just spatial locality, just temporal locality, or both spatial and temporal locality. As a further example illustrating the combination of spatial and temporal locality in selecting particular MD blocks to include in the same superblock, user data tracks that are both accessed in close proximity to one another in terms of time and logical address space of the same LUN are expected to include at least some matching MD. More generally, an embodiment may specify any suitable criteria used to identify a group of MD blocks or structures expected to include at least some matching MD between at least some MD blocks of the group.

As noted above, characteristics of the user data associated with the MD blocks may be used to infer similarity of the MD blocks. Spatial and temporal locality of the user data are among two criteria based on user data characteristics that may be used to infer that MD blocks associated with the user data are similar. Depending on the particular MD fields of the MD structure, other user data characteristics may be used to infer or determine whether MD blocks associated with the user data are similar. As another example, consider a checksum or CRC value such as denoted by CRC 206 of FIG. 4. If two tracks of user data match or are similar in that, for example, they only differ in content by a specified number of bits in corresponding bit positions, the CRC values for such two tracks of user data may be expected to match or be similar (e.g., not have many different bit values in corresponding bit positions of the CRC field). In other words the CRC field 206 is an example of MD content that varies with the content of the user data. The fewer differences between two user data tracks such as in terms of bit value representations, the closer or less differences expected in the CRC values of the two user data tracks. For example, the first bit sequence 10110110 01110000 and the second bit sequence 10010110 01110000 differ by one bit yet the CRC of both (e.g., CRC=01110000) are identical due to the correction factor for the changed bit. As such, similarity between two tracks of user data may be used to infer similarity between one or more MD fields of MD associated with such user data tracks.

As another example, in at least one embodiment, MD blocks for logically consecutive tracks may be stored sequentially in consecutive and contiguous locations in memory. For example, MD block A, MD block B and MD block C may be sequentially stored in consecutive and contiguous memory locations logically next to one another. MD block A may include MD for track 0 of LUN X, MD block B may include MD for track 1 of the same LUN X, and MD block B may include MD for track 2 of the same LUN X. Generally, MD for all the logically sequential consecutive and contiguous tracks of user data of LUN X may be stored sequentially in logically consecutive and contiguous memory locations. As a result, in such an embodiment, spatial locality of reference with respect to memory locations of the MD blocks may be used as criteria to infer similarity of content of the MD blocks. In particular, MD blocks stored in logically consecutive and contiguous memory locations are similar and expected to have at least some matching MD content, such as with respect to the LUN ID field 210 and the LBA field 212. For example, MD blocks A and B may be stored in adjacent memory locations M1 and M2. More generally, MD blocks stored within some specified proximity, such as within some specified distance in terms of memory locations or addresses, have spatial proximity and may be determined to be similar and expected to have at least some matching MD content. For example, even though MD blocks A and C noted above are not stored at logically consecutive and contiguous memory locations (e.g., MD block B may be located between MD blocks A and C), MD blocks A and C are within a specified distance, such as a number of memory address locations, and are similar, whereby they are expected to have at least some matching MD content (e.g. such as with respect to the LUN ID field 210 and the LBA field 212).

To further illustrate use of spatial and temporal locality of reference and also the known MD structure and layout, such as illustrated in FIG. 4 in connection with determining similar MD blocks that are expected to include at least some matching MD content, reference is again made to FIG. 5. As noted above, FIG. 5 denotes an example illustrating MD blocks or structures included in the same single MD superblock. As also noted above, each row of the MD superblock 300 represents a single MD block or structure having a layout as described in connection with FIG. 4. Column 302 of the superblock 300 includes the TS field for each MD block. Column 304 of the superblock 300 includes the LUN ID field for each MD block. Column 306 includes the LBA field for each MD block. For purposes of simplification of illustration, the remaining MD fields of the superblock 300 are omitted.

In this example 300, the blocking processing of the first step may group together 512 MD blocks or structures corresponding to tracks of user data stored at LBAs 0 through 511, inclusively, on the same LUN 5. The blocking processing may determine that the 512 MD blocks are similar based on spatial locality of the 512 MD blocks as stored in memory, or more generally on some form of storage (e.g., the 512 MD blocks may be stored at logically consecutive contiguous locations in the memory or storage). The blocking processing may also determine that the 512 MD blocks are similar based on spatial locality of the associated user data and based on the LUN ID field of the MD structure since the associated user data tracks are located on the same LUN 5. Additionally, the 512 MD blocks may be determined as similar based on spatial locality and based on the LBA field of the MD structure since the associated user data tracks are located at LBAs 0 through 511. Thus, all such LBAs are within the same specified LBA range, distance or size, such as 512.

Since the 512 MD blocks for LBAs 0 through 511 of LUN 5 are determined to be similar based on spatial locality, at least some of the MD content of the 512 MD blocks is expected to be the same in the group of 512 MD blocks. In particular, since all MD blocks describe user data of the same LUN 5 and it is known that each MD block includes a LUN ID field 304, the LUN ID field 304 of each of the 512 MD blocks is expected to be the same (e.g., expected to denote LUN 5).

As noted in connection with FIG. 4, the LBA field of the MD block is 32 bits. Since the LBA values of the 512 MD blocks are all in the range 0-511, all the LBAs 306 in the superblock 300 may be expressed as a 9 bit value using the 9 least significant bits (LSBs) of the LBA field 306 with the remaining 23 most significant bits (MSBs) of the LBA field 306 all being zeroes. Thus, the 23 MSBs of all the LBA fields 306 are expected to be the same (e.g., all expected to be 0).

In this example 300, the blocking processing of the first step may group together 512 MD blocks or structures corresponding to tracks of user data stored at LBAs 0 through 511, inclusively, on the same LUN 5. The blocking processing may also determine that the 512 MD blocks are similar based on temporal locality since the associated user data tracks at LBAs 0 through 511 as well as the 512 MD blocks may all be accessed within a specified time period or window of time. In this example, assume that the user data tracks at LBAs 0 through 511 are accessed within the specified time period on the same date. In this case, all the values in the TS field 302 of the MD blocks are expected to denote the same date, such as the same month, day and year. Additionally, all the values in the TS field 302 denote a time value within the specified time period, such as between 2 and 3 pm. In this case, the portion of the timestamp that denotes the time of day, such as within a 24 hour period, may be expected to have some bits that are the same in at least some of the 512 MD blocks.

Consistent with discussion above, the determination of what MD blocks are similar, and thus expected to have at least some portion of MD that is the same in at least some of the MD blocks, may be based on criteria including spatial and temporal locality of the MD blocks, temporal and spatial locality of the user data tracks associated with the MD blocks and also the known MD structure and layout, such as illustrated in FIG. 4. Additionally, with reference back to FIG. 3, the pages of MD blocks or structures in the example 150 may be stored in the cache. Assuming each page of MD blocks, such as 152, is stored in a single cache slot or location, spatial locality may be based on the fact that the MD blocks of 152 are located near each other (e.g., within the same page) in the cache, memory or other storage. In at least one embodiment, as noted above, MD blocks that are co-located or more generally, located near each other in cache, memory or other storage may have spatial locality and thus expected to be similar where at least some of the MD fields or portions of the MD fields are expected to be the same in the MD blocks.

The particular criteria and technique used to determine similar MD blocks that are expected to have at least some matching MD portions may vary with embodiment.

Subsequent to performing the first step including blocking, MD superblocks are formed in which each MD superblock includes a group of MD blocks that are similar and expected to have at least some matching MD portions in at least some of the MD blocks of the group. Subsequent to completing the first step in which blocking is performed, a second step including filtering is performed. The filtering may be characterized generally as processing performed that groups together portions of the MD within the same MD superblock that are similar and thus expected to have at least a partial MD content match. For example, two or more portions of MD may be grouped together within the same MD superblock if the two or more portions of MD are expected to include at least a specified number of matching corresponding bits or content.

In an embodiment in accordance with techniques herein, content included in the same MD field (e.g., the LUN ID field or the LBA field) of MD blocks of the same superblock may be expected to have at least a partial match across at least some of the MD blocks of the same superblock. Thus, the filtering relies on neighboring MD portions, such as those in the same superblock, having similar or matching content to improve data compression.

The filtering may include reorganizing or arranging the MD of the superblock so that portions of the MD that are expected to be the same or similar (e.g., expected to have at least some matching content) may be group together within the superblock. For example, the MD portions that are expected to be the same or similar may be included in the same row in the superblock structure, in consecutive locations in a row of the superblock structure, or within some specified logical distance or range of consecutive locations in the superblock structure. Consistent with discussion herein, in at least one embodiment, a group of MD portions that are similar are expected to have at least some matching content across the portions. The group of MD portions may be stored in locations of the superblock that are consecutive locations in the data stream provided as an input to compression processing. For example, in at least one embodiment, the rows of the superblock may be provided in sequential order to compression processing. Thus, the data stream provided in sequential order to the compression processing may be denoted as superblock [1,1], [1,2], . . . [1, N], [2,1], [2,2] . . . , where N denotes the last element in row 1, the first row of the superblock.

Based on discussion above and with reference to FIG. 5, filtering may determine a first group of similar, or more specifically, matching, MD portions based on the LUN ID 304 of all MD blocks of the superblock 300. As such, filtering may include all the LUN ID values of 304 from all 512 MD blocks of the superblock into the same 2 rows of the superblock as illustrated by elements 402 and 404 of FIG. 6.

Filtering may also determine a second group of similar MD portions based on the LBA field 306 of all MD blocks of the superblock 300. Further, the particular range of LBA values is known to be 0-511 as described above. Thus, the 23 MSBs of each LBA field 306 of all 512 MD blocks of the superblock are expected to be the same and equal to all zeroes. As such, filtering may determine the second group of similar data portion to include the 23 MSBs of the LBA field 306 from all 512 MD blocks of the superblock into the same row of the superblock as illustrated by elements 406 of FIG. 6. Additionally, although the remaining 9 LSB values of the LBA field 306 of all 512 MD blocks do not completely match, such MD portions may be similar in that at least some number of corresponding bits in at least some of the MD portions are expected to match. As such, filtering may determine a third group of similar data portions to include the 9 LSBs of the LBA field 306 from all 512 MD blocks of the superblock into the same row of the superblock as illustrated by element 408 of FIG. 6.

Filtering may also determine a fourth group of similar MD portions based on the TS field 302 of all MD blocks of the superblock 300. In particular, as discussed above, all tracks of user data associated with the 512 MD blocks of the superblock 300 have been referenced on the same date. Thus, a number of bits in all the TS values denoting the date may be expected to match across all 512 MD blocks. For purposes of illustration, Part A may denote the number of bits in each of the TS values in 302 expected to be the same, Part A corresponds to the particular bit positions in the TS field 302 encoding the date. As such, filtering may determine the fourth group of similar data portions to include the bit values for Part A of the TS field 302 from all 512 MD blocks of the superblock into the same row of the superblock as illustrated by element 410 of FIG. 6.

In a similar manner, other similar MD portions of the MD blocks of the superblock may be grouped together and located within close proximity to one another, such as consecutively located, within the superblock.

In at least one embodiment in accordance with the techniques herein, the filtering process may include performing the bitshuffle algorithm described, for example, in "A compression scheme for radio data in high performance computing", K. Masui and M. Amiri and L. Connor and M. Deng and M. Fandino and C. Hofer and M. Halpern and D. Hanna and A. D. Hincks and G. Hinshaw and J. M. Parra and L. B. Newburgh and J. R. Shaw and K. Vanderlinde, Astronomy and Computing, Vol. 12, pages 181-190, 2015, ISSN: 2213 1337, which is incorporated by reference herein. Generally, for structured known data arranged as a data array of elements, bitshuffle breaks apart the bits of each data element grouping together all the first bits of each element, grouping together all the second bits of each element, and so on. The bitshuffle algorithm relies on neighboring or consecutive elements being highly correlated to improve data compression.

In at least one embodiment using bitshuffle as applied to a single MD superblock, each data element of the array may be a single MD block. Bitshuffle arranges the bits of each MD block into a matrix with dimensions of the number of array elements (e.g., number of MD blocks in the single MD superblock) by the size of each element in bits, and then performs a transpose of the matrix.

As known in the art, the transpose of a matrix results in a new matrix whose rows are the columns of the original matrix. Generally, the $i^{th}$ row of the original matrix is the $i^{th}$ column in the transpose of the original matrix. Thus similarly, the $i^{th}$ column of the original matrix is the $i^{th}$ row in the transpose of the original matrix.

In connection with the techniques herein, each row of the matrix may correspond to a single MD block within the MD superblock. The bit positions of the content stored in a single MD block may correspond to the columns of the matrix. For example, consider a MD superblock as described above and illustrated in FIG. 5 with 512 MD blocks where a single MD block includes 128 bytes and thus 128*8=1024 bits. In this case with reference now to FIG. 7, the matrix 500 includes 512 rows, one row corresponding to each of the 512 MD blocks. The matrix 500 also includes 1024 columns, one for each of the 1024 bits of content of each MD block. The content of the matrix stored at a particular cell or entry [i,j] where "i" denotes the particular MD block and "j" denotes the particular bit position within the particular MD block, is the content of bit "j" in the particular MD block.

Figure 7:
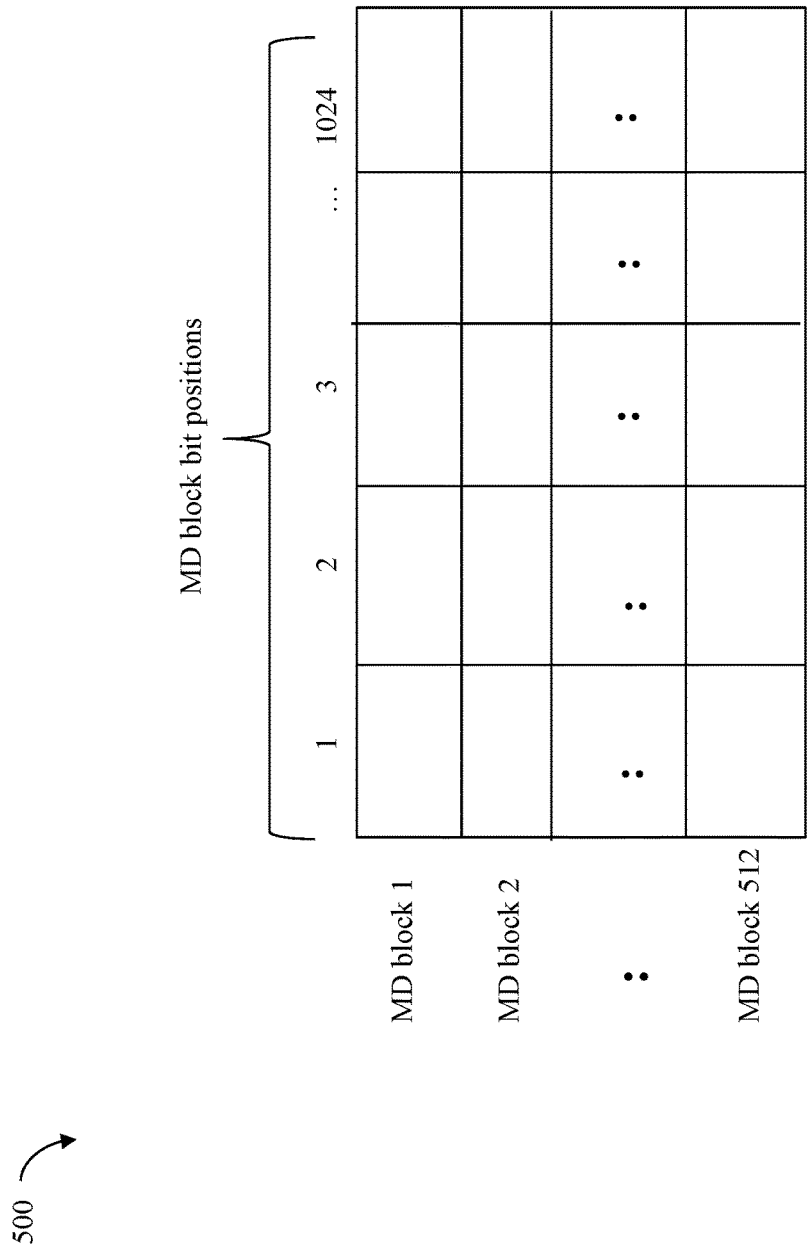
FIG. 7 is an example illustrating a representation of a MD superblock as a matrix used in connection with the bitshuffle algorithm in an embodiment in accordance with the techniques herein.

In at least one embodiment, the MD superblock may be represented as just described as a matrix illustrated in FIG. 7 where the transpose of the matrix may then be performed. As a result, the bit values for each bit position N of all the MD blocks within the super block are stored in row N of the transposed matrix, where N is an integer in the inclusive range 1 through 1024 (using a 1-based matrix indexing scheme). In other words, the bit values for bit position 1 of all the MD blocks within the super block are stored in row 1 of the transposed matrix, the bit values for bit position 2 of all the MD blocks within the super block are stored in row 2 of the transposed matrix, and so on, for each of the 1024 bit positions.

In at least one embodiment using the techniques herein, the resulting bit-wise transposed matrix may then be compressed. Thus, the bitshuffle technique as described herein is one way in which an embodiment may perform the filtering process to rearrange the MD in the superblock and obtain a resulting arrangement that groups bits of the different MD blocks together, such as in the same row. The bitshuffle algorithm relies on neighboring or consecutive matrix elements being highly correlated to improve data compression.

Based on the known MD structure or layout of each MD block (e.g., as in FIG. 4) and the different MD fields represented in the MD structure (e.g., used to interpret the content and type of information of the MD fields), one or more of the MD fields of MD blocks in the same superblock are expected to include the same or similar content across multiple MD blocks in the superblock. For example, as discussed above, the LUN ID field located at defined bit positions in each of the MD blocks of the superblock may be expected to match. The LBA offset field located at defined bit positions in each of the MD blocks of the superblock may be expected to be similar in that at least a specified number of bits, such as at most significant 23 bits, of the LBA offset field are expected to match. For example, assuming the starting LBA is 0 and based on spatial locality, a superblock may include 512 MD blocks associated with LBA 0 through LBA 511 of LUN A. Nine bits may be used to encode all values in the LBA range 0 through 511, inclusively. If the LBA offset field is 32 bits in little-endian format and the least significant nine bits are used to encode the possible LBA range −511, then the remaining 23 bits of each LBA field of each of the MD blocks are expected to match and all be zeroes. The remaining 9 LSBs of the LBA offset field is expected to have a varying number of matching bit values in a particular bit position between any 2 MD blocks.

An embodiment in accordance with the techniques herein may utilize any suitable instruction set and computer architecture available that may vary with the system and platform used for implementation. For example, an embodiment in accordance with techniques herein may be performed by executing code in a system using one or more CPUs and the x86 instruction set and architecture by Intel®. An embodiment may, for example, utilize the Advanced Vector Extensions (AVX) of the x86 instruction set architecture (ISA) for microprocessors from Intel®, such as Intel® Advanced Vector Extensions 2 (Intel® AVX2) or Intel® Advanced Vector Extensions 512 (Intel® AVX-512). Generally, AVX are extensions to the x86 architecture where, for example, the Intel® AVX2 instruction set operates on 256 bit wide registers and the Intel® AVX-512 instruction set operates on 512 bit wide registers. Generally, as known in the art, the AVX instructions are also characterized as single instruction multiple data (SIMD) instructions that provide for increased processor throughput by performing multiple computations in a single instruction. Techniques herein may utilize the extended register set available, such as in the Intel®AVX2 and Intel® AVX-512 instruction sets, where the number of available registers as well as extended larger size of each register allows for more efficient vectorized instruction sets.

For example, the VPSHUFB instruction in the AVX2 instruction set performs in-place shuffles of bytes in the destination operand (the first operand) according to the shuffle control mask in the source operand (the second operand). In at least one embodiment, the bit-transpose operation of the matrix of the MD blocks may be performed using such vectorized instruction sets such as using the VPSHUFB instruction. The instruction permutes the data in the destination operand, leaving the shuffle mask unaffected. In a similar manner, an embodiment may use other vectorized instructions sets such as streaming SIMD Extensions (SSE) that is another SIMD instruction set extension to the x86 architecture.

Once the second step including filtering has completed, one or more the filtered superblocks are produced and provided as an input to the third step of compression processing. In at least one embodiment, each filtered superblock may be compressed as a single unit of data that is stored in the L1 cache and then compressed using a lossless compression technique, such as the LZ4 compression algorithm known in the art and discussed elsewhere herein. Generally, an embodiment in accordance with the techniques herein may use a time-efficient compression algorithm that takes advantage of the characteristics of the resulting data stream of filtered superblocks generated by the pre-compression processing, such as a result of the blocking and filtering processing as described herein.

In at least one embodiment, a compression technique may be used that is time-efficient since the compression and decompression of the MD superblocks may be performed while servicing I/O operations, such as part of the I/O or data path, and it is desirable to limit any adverse performance impact on I/O performance.

The particular one or more criteria used to determine similar MD blocks and similar MD portions of such MD blocks may vary with embodiment. For example, additional runtime processing may be performed in order to determine or infer similar MD blocks based on characteristics of user data. For example, additional runtime processing may be needed in order to determine what user data tracks have temporal locality in order to infer similarity between the MD blocks of such user data tracks. As another example, additional runtime processing may be needed in order to determine what user data tracks have similar or matching user data in order to infer similarity between the MD blocks of such user data tracks. As such, in order to avoid any additional adverse impact on I/O performance in at least one embodiment in which the compression is performed while servicing I/O operations, temporal locality of user data tracks and possibly other criteria requiring additional analysis of the user data to infer similar MD blocks may not be included in the criteria used to determine similar MD blocks. However, as a variation, techniques herein may be performed at particular times where consuming additional computation time and resources is acceptable. For example, during periods of low or idle system utilization such as during weekends or evening hours, an embodiment may perform the additional processing needed to infer MD block similarity based on user data characteristics. For example, during periods of low or idle system utilization such as during weekends or evening hours, processing may determine temporal locality of user data tracks and may form MD superblocks using one or more criteria including temporal locality of the user data tracks.

Figure 8:
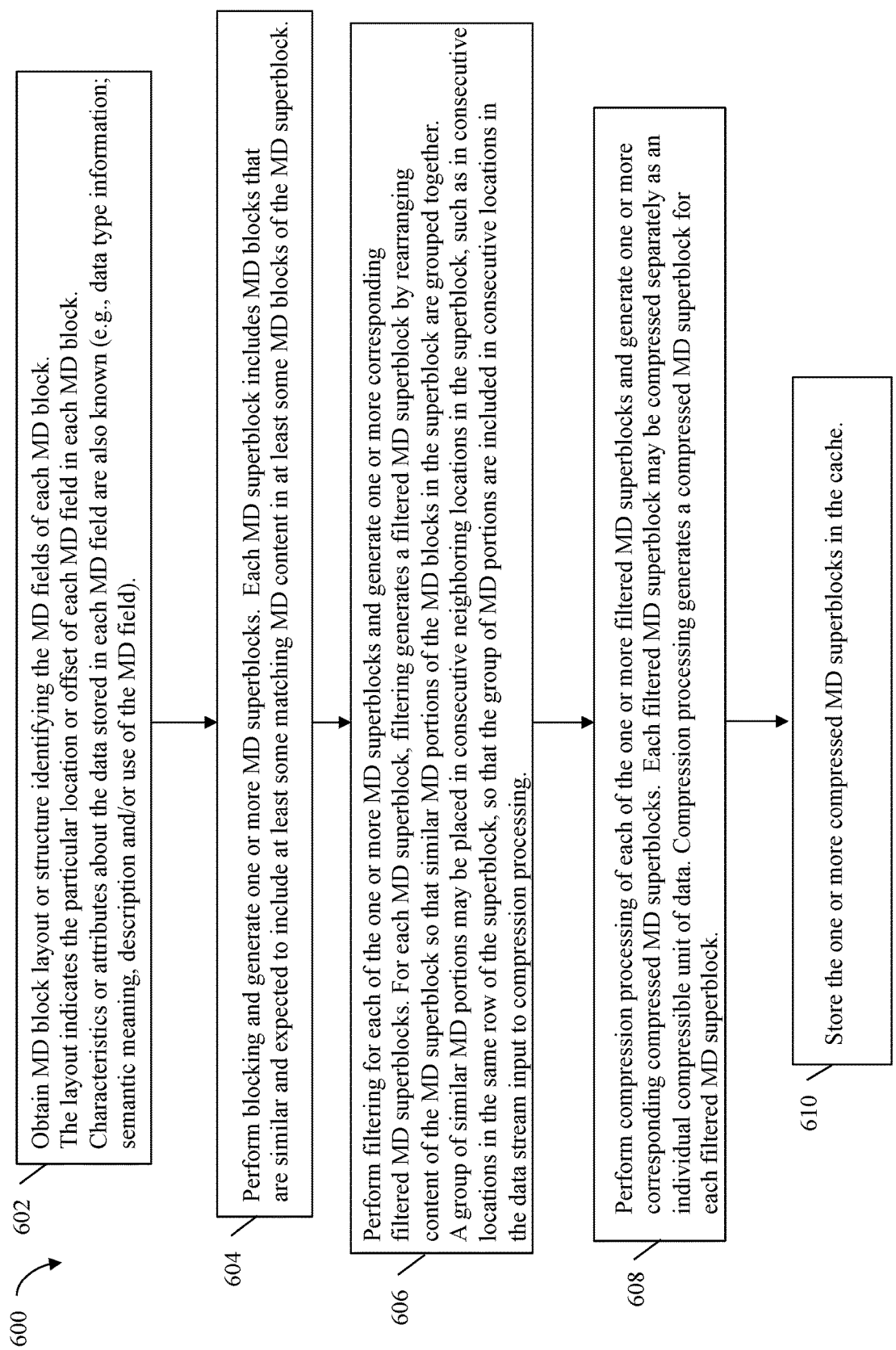
FIGS. 8 and 9 are flowcharts of processing steps that may be performed in an embodiment in accordance with the techniques herein.

Referring to FIG. 8, shown is a flowchart of processing steps that may be performed in an embodiment in accordance with the techniques herein. The flowchart 600 summarizes processing described above. At the step 602, the MD block layout or structure is obtained. The MD block layout or structure, such as illustrated in FIG. 4, identifies the MD fields of each MD block. The layout indicates the particular location or offset of each MD field in each MD block. Characteristics or attributes about the data stored in each MD field are also known (e.g., data type information; semantic meaning, description and/or use of the MD field). From the step 602, processing proceeds to the step 604.

At the step 604, blocking is performed that generates one or more MD superblocks. Each MD superblock includes MD blocks that are similar and expected to include at least some matching MD content in at least some MD blocks of the MD superblock. As described herein, one or more criteria may be used to determine similar MD blocks to be included in the same MD superblock. From the step 604, processing proceeds to the step 606.

At the step 606, processing includes performing filtering for each of the one or more MD superblocks and generating one or more corresponding filtered MD superblocks. For each MD superblock, filtering generates a filtered MD superblock by rearranging content of the MD superblock so that similar MD portions of the MD blocks in the superblock are grouped together. A group of similar MD portions may be placed in consecutive neighboring locations in the superblock, such as in consecutive locations in the same row of the superblock, so that the group of MD portions are included in consecutive locations in the data stream input to compression processing. A particular MD field may be expected to include at least some matching content in at least some of the MD blocks. Particular bit positions of the particular MD field may be expected to include the matching content in at least some of the MD blocks of the superblock. As described herein, filtering in at least one embodiment may include performing the bitshuffle algorithm or technique. From the step 606, processing proceeds to the step 608.

At the step 608, processing includes performing compression processing of each of the one or more filtered MD superblocks and generating one or more corresponding compressed MD superblocks. Each filtered MD superblock may be compressed separately as an individual compressible unit of data. Compression processing generates a compressed MD superblock for each filtered MD superblock. From the step 608, processing proceeds to the step 610.

At the step 610, the one or more compressed MD superblocks generated in step 608 may be stored in the cache.

Figure 9:
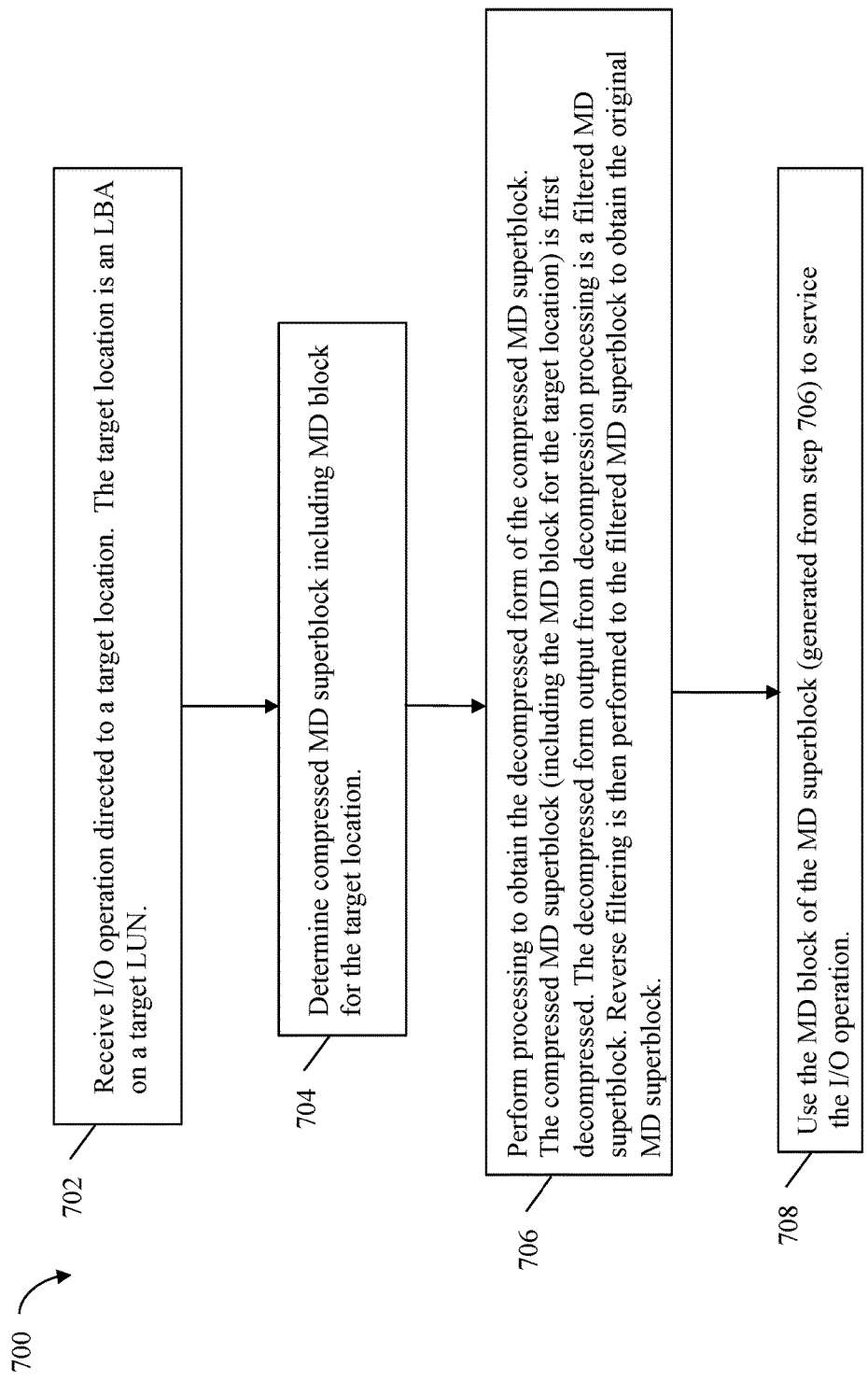

Referring to FIG. 9, shown is a second flowchart of processing that may be performed in an embodiment in accordance with the techniques herein. The flowchart 700 describes processing that may be performed as part of the I/O or data path when information in a MD block is needed in servicing a received I/O operation, such as a read or write operation.

At the step 702, an I/O operation is received. The I/O operation is directed to a target location. The target location may be expressed as an LBA on a target LUN. From the step 702, control proceeds to the step 704. At the step 704, processing determines the compressed MD superblock including the MD block for the target location. For example, multiple compressed MD superblocks for the target LUN may be stored in the cache. The step 704 includes determining the cache location of the compressed MD superblock including the MD block for the target location. From the step 704, control proceeds to the step 706.

Figure 6:
FIG. 6 is an example illustrating a filtered MD superblock in an embodiment in accordance with the techniques herein.

The step 706 includes performing processing to obtain the decompressed form of the compressed MD superblock. The step 706 includes first decompressing the compressed MD superblock including the MD block for the target location. Note that the compressed MD superblock is actually a compressed form of a filtered MD superblock. Therefore the decompressed form output from decompression processing is a filtered MD superblock. The filtered MD superblock is now further processing in order to obtain the original MD superblock (that was previously filtered in step 606 of FIG. 8). Thus, at this point, reverse filtering of the decompression output (e.g., the filtered MD superblock) is performed to obtain the original MD superblock. The reverse filtering is reversing the processing performed of the step 606. For example, if the bitshuffle algorithm or technique was previously performed in the step 606 to the MD superblock, then reverse filtering includes taking the bitwise transpose of the decompressed filtered MD superblock to obtain the original MD superblock. As another example, if the filtering step 606 rearranged and grouped together different MD portions from different MD blocks as illustrated in FIG. 6, then reverse filtering reverses such processing to restore the original placement of the MD portions such as illustrated in FIG. 5.

As known in the art, decompression processing generally is the reversal of the compression processing. For lossless compression, decompression processing results in obtaining the original data that was compressed. In connection with the techniques herein, the step 706 includes reversing the prior processing performed to the original MD superblock in order to obtain the compressed MD superblock. Such processing of step 706 may include reversing the processing of steps 608 and 606 in order to obtain the original MD superblock (as formed in step 604).

The techniques herein may be performed using any suitable hardware and/or software. For example, the techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of processing metadata (MD) comprising:
   determining, in accordance with one or more criteria, a plurality of MD blocks that are similar and expected to have matching corresponding portions of MD in at least some of the plurality of MD blocks;
   forming a MD superblock including the plurality of MD blocks;
   filtering the MD superblock and generating a filtered MD superblock, wherein said filtering includes rearranging content of the MD superblock so that a first plurality of MD portions that are similar are grouped together in the filtered MD superblock, wherein at least some of the first plurality of MD portions that are similar are expected to match; and
   compressing the filtered MD superblock and generating a compressed filtered MD superblock, and wherein said filtering includes:
   representing the plurality of MD blocks as a matrix, wherein a plurality of rows of the matrix correspond to the plurality of MD blocks and each of the plurality of rows corresponds to one of the plurality of MD blocks, wherein a plurality of columns of the matrix correspond to a total number of bit positions in each of the plurality of MD blocks.

2. The method of claim 1, further comprising:
   storing the compressed filtered MD superblock in a cache.

3. The method of claim 1, wherein each of the first plurality of MD portions that are similar is included in one of the plurality of MD blocks.

4. The method of claim 3, wherein each of the first plurality of MD portions that are similar is included in a same MD field in one of the plurality of MD blocks.

5. The method of claim 4, wherein each of the plurality of MD blocks has a same defined structure including a plurality of MD fields, and wherein the same MD field is located at a same logical offset in each of the plurality of MD blocks.

6. The method of claim 1, wherein the one or more criteria include spatial locality of user data associated with the plurality of MD blocks.

7. The method of claim 1, wherein the one or more criteria include temporal locality of user data associated with the plurality of MD blocks.

8. The method of claim 1, wherein the one or more criteria include spatial location of the plurality of MD blocks.

9. The method of claim 1, wherein the one or more criteria include one or more characteristics of user data associated with the plurality of MD blocks.

10. The method of claim 9, wherein the one or more characteristics include a number of differences between two user data portions of a same MD field described by two of the plurality of MD blocks.

11. The method of claim 1, wherein each of the plurality of MD blocks includes a plurality of MD fields.

12. The method of claim 11, wherein said filtering includes:
    performing a bit-wise transpose of the matrix to obtain a transposed matrix.

13. The method of claim 12, wherein the transposed matrix is the filtered MD superblock provided as an input to compression processing performed in said compressing.

14. A method of processing metadata (MD) comprising:
    determining, in accordance with one or more criteria, a plurality of MD blocks that are similar and expected to have matching corresponding portions of MD in at least some of the plurality of MD blocks;

forming a MD superblock including the plurality of MD blocks;

filtering the MD superblock and generating a filtered MD superblock, wherein said filtering includes rearranging content of the MD superblock so that a first plurality of MD portions that are similar are grouped together in the filtered MD superblock, wherein at least some of the first plurality of MD portions that are similar are expected to match;

compressing the filtered MD superblock and generating a compressed filtered MD superblock;

storing the compressed filtered MD superblock in a cache;

receiving an I/O operation directed to a target location;

determining that a first MD block of the plurality of MD blocks is associated with the target location, wherein the target location is included in a logical address range of a logical device having corresponding metadata included in the first MD block;

processing the compressed filtered MD superblock to obtain the MD superblock; and subsequent to said processing the compressed filtered MD superblock, obtaining the first MD block from the MD superblock and using the first MD block to service the I/O operation, and wherein said processing includes:

decompressing the compressed filtered MD superblock to obtain a decompressed filtered MD superblock; and subsequent to said decompressing, reverse filtering the decompressed filtered MD superblock to obtain the MD superblock.

15. A system comprising:
at least one processor; and
a memory comprising code stored thereon that, when executed, performs a method of processing metadata (MD) comprising:
  determining, in accordance with one or more criteria, a plurality of MD blocks that are similar and expected to have matching corresponding portions of MD in at least some of the plurality of MD blocks;
  forming a MD superblock including the plurality of MD blocks;
  filtering the MD superblock and generating a filtered MD superblock, wherein said filtering includes rearranging content of the MD superblock so that a first plurality of MD portions that are similar are grouped together in the filtered MD superblock, wherein at least some of the first plurality of MD portions that are similar are expected to match; and
  compressing the filtered MD superblock and generating a compressed filtered MD superblock, and wherein said filtering includes:
  representing the plurality of MD blocks as a matrix, wherein a plurality of rows of the matrix correspond to the plurality of MD blocks and each of the plurality of rows corresponds to one of the plurality of MD blocks, wherein a plurality of columns of the matrix correspond to a total number of bit positions in each of the plurality of MD blocks.

16. A non-transitory computer readable medium comprising code stored thereon that, when executed, performs a method of processing metadata (MD) comprising:
  determining, in accordance with one or more criteria, a plurality of MD blocks that are similar and expected to have matching corresponding portions of MD in at least some of the plurality of MD blocks;
  forming a MD superblock including the plurality of MD blocks;
  filtering the MD superblock and generating a filtered MD superblock, wherein said filtering includes rearranging content of the MD superblock so that a first plurality of MD portions that are similar are grouped together in the filtered MD superblock, wherein at least some of the first plurality of MD portions that are similar are expected to match; and
  compressing the filtered MD superblock and generating a compressed filtered MD superblock, and wherein said filtering includes:
  representing the plurality of MD blocks as a matrix, wherein a plurality of rows of the matrix correspond to the plurality of MD blocks and each of the plurality of rows corresponds to one of the plurality of MD blocks, wherein a plurality of columns of the matrix correspond to a total number of bit positions in each of the plurality of MD blocks.

17. The non-transitory computer readable medium of claim 16, wherein the method further comprises:
  storing the compressed filtered MD superblock in a cache.

18. The non-transitory computer readable medium of claim 16, wherein each of the first plurality of MD portions that are similar is included in one of the plurality of MD blocks.

19. The non-transitory omputer readable medium of claim 18, wherein each of the first plurality of MD portions that are similar is included in a same MD field in one of the plurality of MD blocks and wherein each of the plurality of MD blocks has a same defined structure including a plurality of MD fields, and wherein the same MD field is located at a same logical offset in each of the plurality of MD blocks.

20. A non-transitory computer readable medium comprising code stored thereon that, when executed, performs a method of processing metadata (MD) comprising:
  determining, in accordance with one or more criteria, a plurality of MD blocks that are similar and expected to have matching corresponding portions of MD in at least some of the plurality of MD blocks;
  forming a MD superblock including the plurality of MD blocks;
  filtering the MD superblock and generating a filtered MD superblock, wherein said filtering includes rearranging content of the MD superblock so that a first plurality of MD portions that are similar are grouped together in the filtered MD superblock, wherein at least some of the first plurality of MD portions that are similar are expected to match;
  compressing the filtered MD superblock and generating a compressed filtered MD superblock;
  storing the compressed filtered MD superblock in a cache;
  receiving an I/O operation directed to a target location;
  determining that a first MD block of the plurality of MD blocks is associated with the target location, wherein the target location is included in a logical address range of a logical device having corresponding metadata included in the first MD block;
  processing the compressed filtered MD superblock to obtain the MD superblock; and
  subsequent to said processing the compressed filtered MD superblock, obtaining the first MD block from the MD superblock and using the first MD block to service the I/O operation, and wherein said processing includes:
  decompressing the compressed filtered MD superblock to obtain a decompressed filtered MD superblock; and subsequent to said decompressing, reverse filtering the decompressed filtered MD superblock to obtain the MD superblock.

21. A system comprising:

at least one processor; and a memory comprising code stored thereon that, when executed, performs a method of processing metadata (MD) comprising:
- determining, in accordance with one or more criteria, a plurality of MD blocks that are similar and expected to have matching corresponding portions of MD in at least some of the plurality of MD blocks;
- forming a MD superblock including the plurality of MD blocks;
- filtering the MD superblock and generating a filtered MD superblock, wherein said filtering includes rearranging content of the MD superblock so that a first plurality of MD portions that are similar are grouped together in the filtered MD superblock, wherein at least some of the first plurality of MD portions that are similar are expected to match;
- compressing the filtered MD superblock and generating a compressed filtered MD superblock;
- storing the compressed filtered MD superblock in a cache;
- receiving an I/O operation directed to a target location;
- determining that a first MD block of the plurality of MD blocks is associated with the target location, wherein the target location is included in a logical address range of a logical device having corresponding metadata included in the first MD block;
- processing the compressed filtered MD superblock to obtain the MD superblock; and
- subsequent to said processing the compressed filtered MD superblock, obtaining the first MD block from the MD superblock and using the first MD block to service the I/O operation, and wherein said processing includes:
- decompressing the compressed filtered MD superblock to obtain a decompressed filtered MD superblock; and
- subsequent to said decompressing, reverse filtering the decompressed filtered MD superblock to obtain the MD superblock.

* * * * *

UNITED STATES PATENT AND TRADEMARK OFFICE
CERTIFICATE OF CORRECTION

| | |
|---|---|
| PATENT NO. | : 11,163,468 B2 |
| APPLICATION NO. | : 16/458864 |
| DATED | : November 2, 2021 |
| INVENTOR(S) | : Aidan O Mahony et al. |

It is certified that error appears in the above-identified patent and that said Letters Patent is hereby corrected as shown below:

In the Claims

Column 30, Line 28:
In Claim 19, the phrase "The non-transitory omputer" should read -- The non-transitory computer --

Signed and Sealed this
Thirty-first Day of May, 2022

Katherine Kelly Vidal
*Director of the United States Patent and Trademark Office*